(12) United States Patent
Byhmer et al.

(10) Patent No.: US 11,604,142 B2
(45) Date of Patent: Mar. 14, 2023

(54) DEVICE FOR MEASURING A PROPERTY OF A MEASUREMENT OBJECT BY LUMINESCENCE

(71) Applicant: ODINWELL AB, Halmstad (SE)

(72) Inventors: Patrik Byhmer, Halmstad (SE); Patrik Strömsten, Mölnlycke (SE)

(73) Assignee: ODINWELL AB, Halmstad (SE)

( * ) Notice: Subject to any disclaimer, the term of this patent is extended or adjusted under 35 U.S.C. 154(b) by 26 days.

(21) Appl. No.: 17/263,104

(22) PCT Filed: Aug. 1, 2019

(86) PCT No.: PCT/SE2019/050721
§ 371 (c)(1),
(2) Date: Jan. 25, 2021

(87) PCT Pub. No.: WO2020/027716
PCT Pub. Date: Feb. 6, 2020

(65) Prior Publication Data
US 2021/0293710 A1   Sep. 23, 2021

(30) Foreign Application Priority Data
Aug. 3, 2018 (SE) .................................. 1830228-1

(51) Int. Cl.
*G01N 21/64* (2006.01)

(52) U.S. Cl.
CPC . *G01N 21/6428* (2013.01); *G01N 2021/6432* (2013.01)

(58) Field of Classification Search
CPC ................... G01N 21/6428; G01N 2021/6432
See application file for complete search history.

(56) References Cited

U.S. PATENT DOCUMENTS

| 4,144,452 A | 3/1979 | Harte |
| 4,968,632 A * | 11/1990 | Brauer ................. A61B 5/0833 |
| | | 422/52 |

(Continued)

FOREIGN PATENT DOCUMENTS

| EP | 0 175 352 A2 | 3/1986 |
| WO | WO 92/05441 | 4/1992 |

(Continued)

OTHER PUBLICATIONS

International Search Report for PCT/SE2019/050721 (PCT/ISA/210) dated Oct. 9, 2019.

(Continued)

*Primary Examiner* — David P Porta
*Assistant Examiner* — Gisselle M Gutierrez
(74) *Attorney, Agent, or Firm* — Birch, Stewart, Kolasch & Birch, LLP

(57) ABSTRACT

A device for monitoring a measurement object, comprising: an active unit having a light source emitting light with a wavelength spectrum and an optical detector. An optical link passes the emitted light to a at least one passive unit. Each passive unit comprises a sensor and a selector for diverting the emitted light to the sensor. The sensor comprises a luminescent material being directly or indirectly affected by the emitted light diverted by the selector. The sensor is sensitive to an external influence by the measurement object for producing a modulated signal, which is passed to said detector via the optical link. The luminescent material may be a fluorescent material, which is directly irradiated by the emitted light from the light source.

18 Claims, 36 Drawing Sheets

(56) References Cited

U.S. PATENT DOCUMENTS

| | | | |
|---|---|---|---|
| 5,217,875 | A | 6/1993 | Karpf |
| 7,670,289 | B1 | 3/2010 | McCall |
| 2001/0031224 | A1 | 10/2001 | Labuda et al. |
| 2003/0128125 | A1 | 7/2003 | Burbank et al. |
| 2005/0038325 | A1 | 2/2005 | Moll |
| 2006/0130591 | A1 | 6/2006 | Perkins |
| 2006/0171845 | A1 | 8/2006 | Martin et al. |
| 2008/0195060 | A1 | 8/2008 | Roger et al. |
| 2010/0130839 | A1 | 5/2010 | Dowling |
| 2010/0304421 | A1 | 12/2010 | Piletsky et al. |
| 2012/0037816 | A1 | 2/2012 | Koehler |
| 2012/0296279 | A1 | 11/2012 | Muller et al. |
| 2013/0203043 | A1 | 8/2013 | Ozcan et al. |
| 2014/0030737 | A1 | 1/2014 | Holmes et al. |
| 2019/0255243 | A1 | 8/2019 | Byhmer |

FOREIGN PATENT DOCUMENTS

| | | | | |
|---|---|---|---|---|
| WO | WO 2013/147670 A1 | 10/2013 | | |
| WO | WO-2021045665 A1 | * | 3/2021 | ............. A61F 13/15 |

OTHER PUBLICATIONS

Written Opinion of the International Searching Authority for PCT/SE2019/050721 (PCT/ISA/237) dated Oct. 9, 2019.

Ferrari, Vittorio; "Distortion-free probes of electricfield". Nature Electronics 1, 10-11 (2018).

Hect et al. "A low-cost optode-array measuring system based on 1 mm plastic optical fibers—new technique for in situ detection and quantification of pyrite weathering processes", Sensors and Actuators B 81 (2001), pp. 76-82.

The Extended European Search Report for PCT/SE2019/050721, dated Mar. 31, 2022.

* cited by examiner

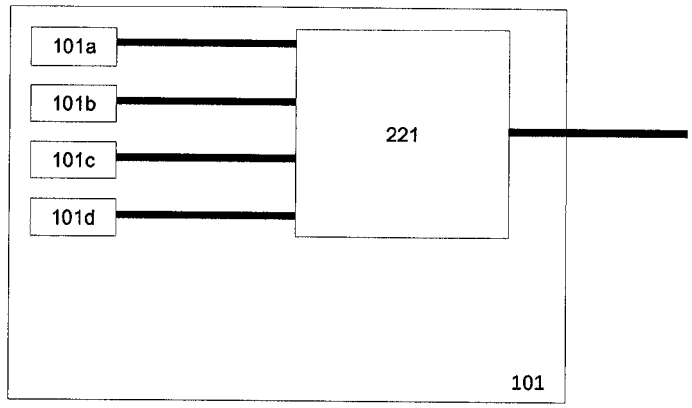
Figure 2.1
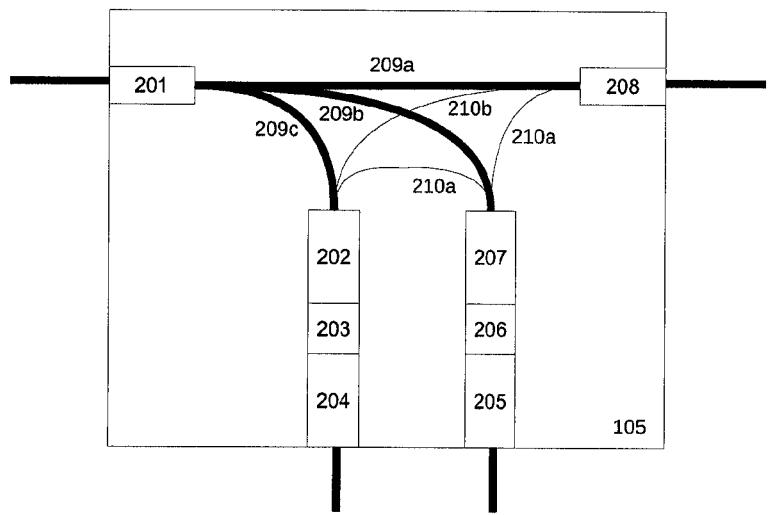
Figure 2.2

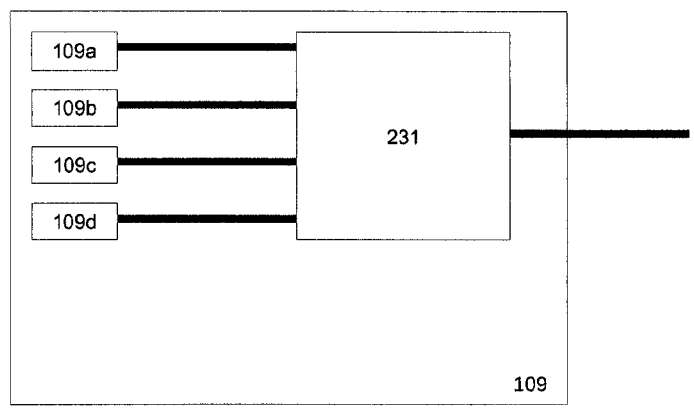
Figure 2.3

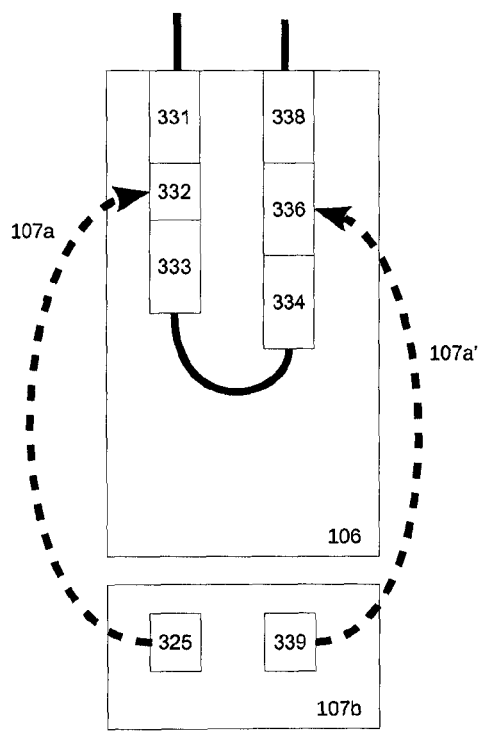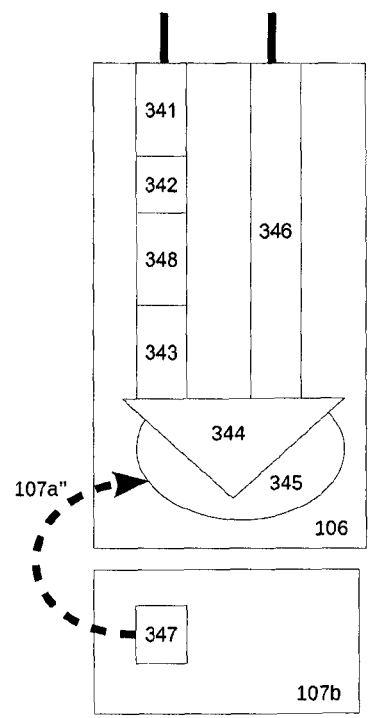
Figure 3.1    Figure 3.2

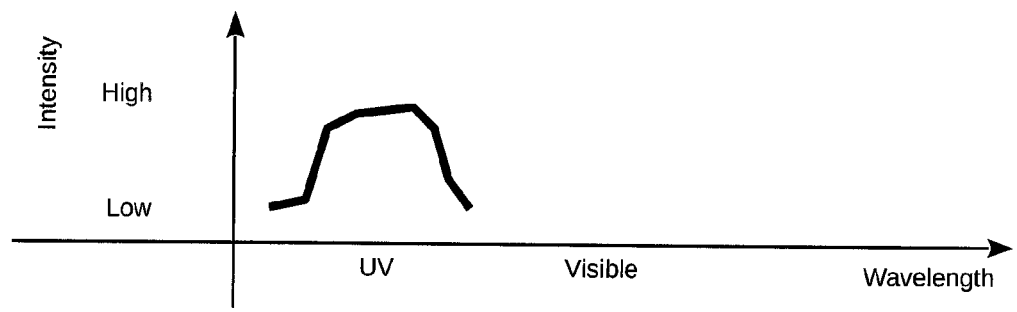
Figure 4.1
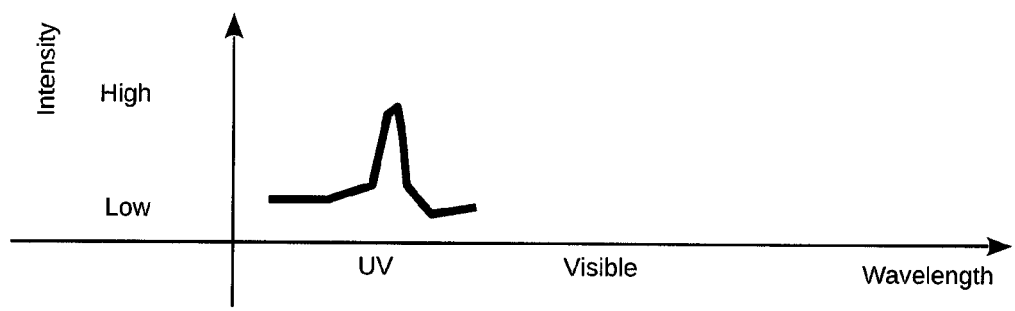
Figure 4.2
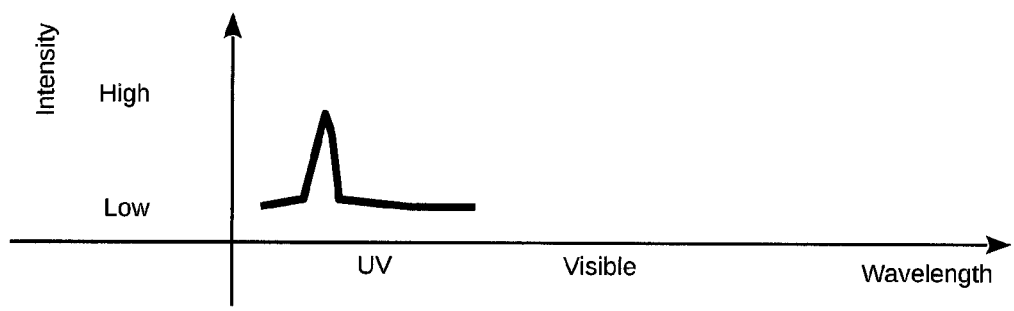
Figure 4.3

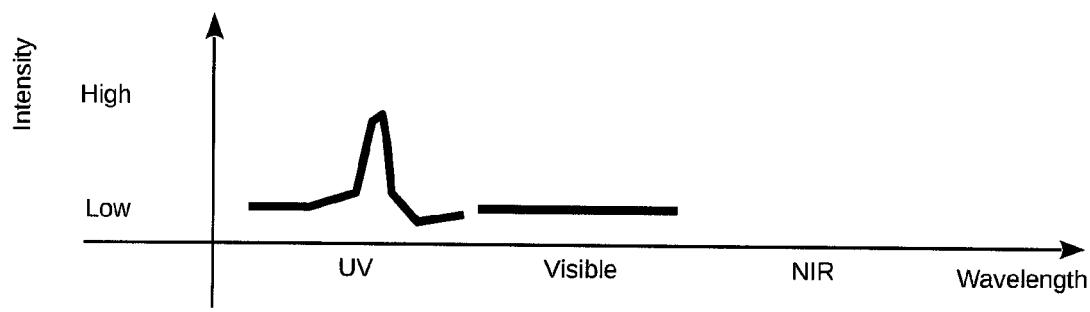
Figure 5.1
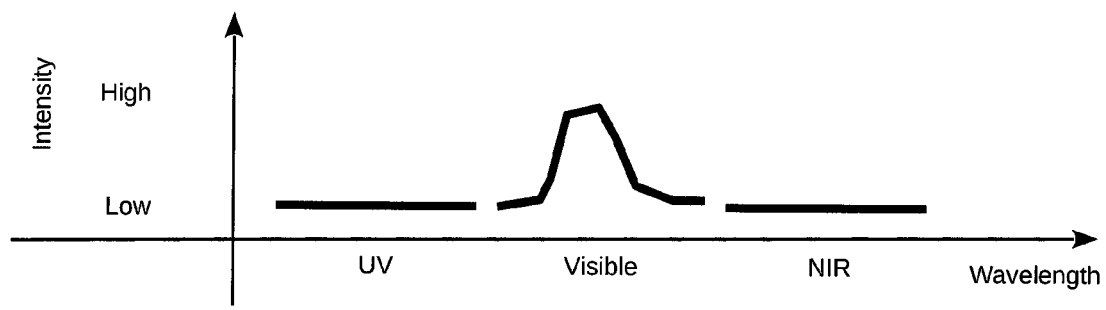
Figure 5.2
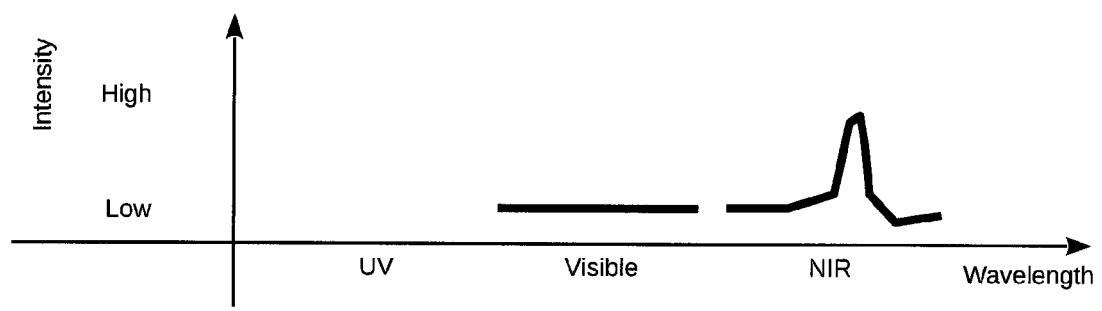
Figure 5.3

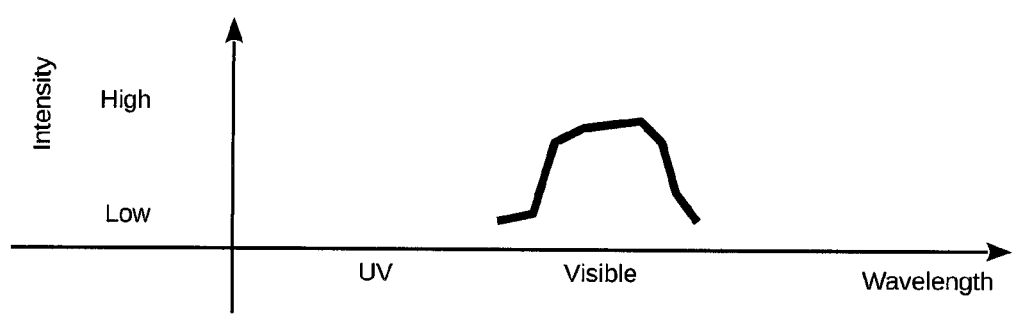
Figure 6.1
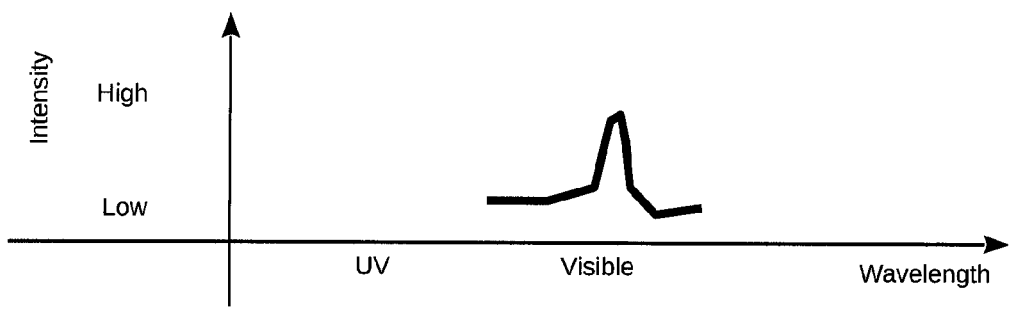
Figure 6.2

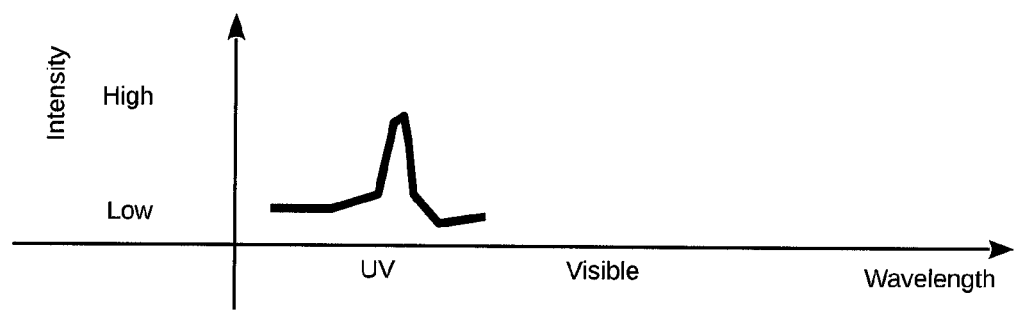
Figure 7.1
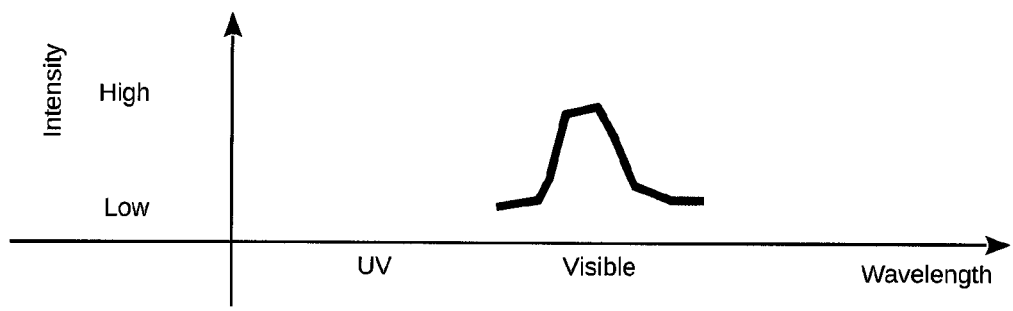
Figure 7.2
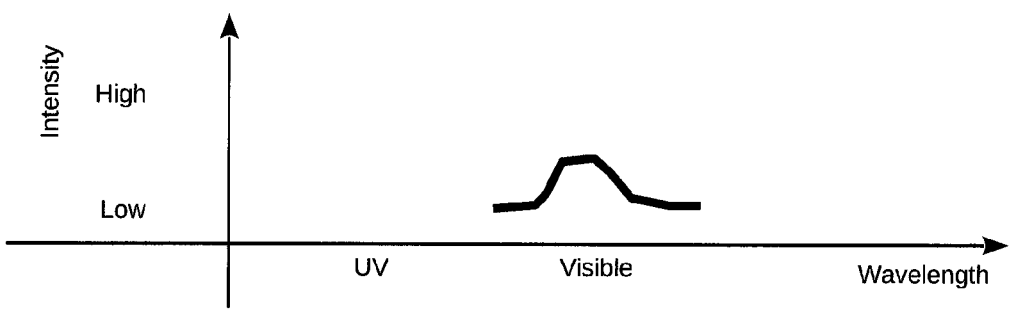
Figure 7.3

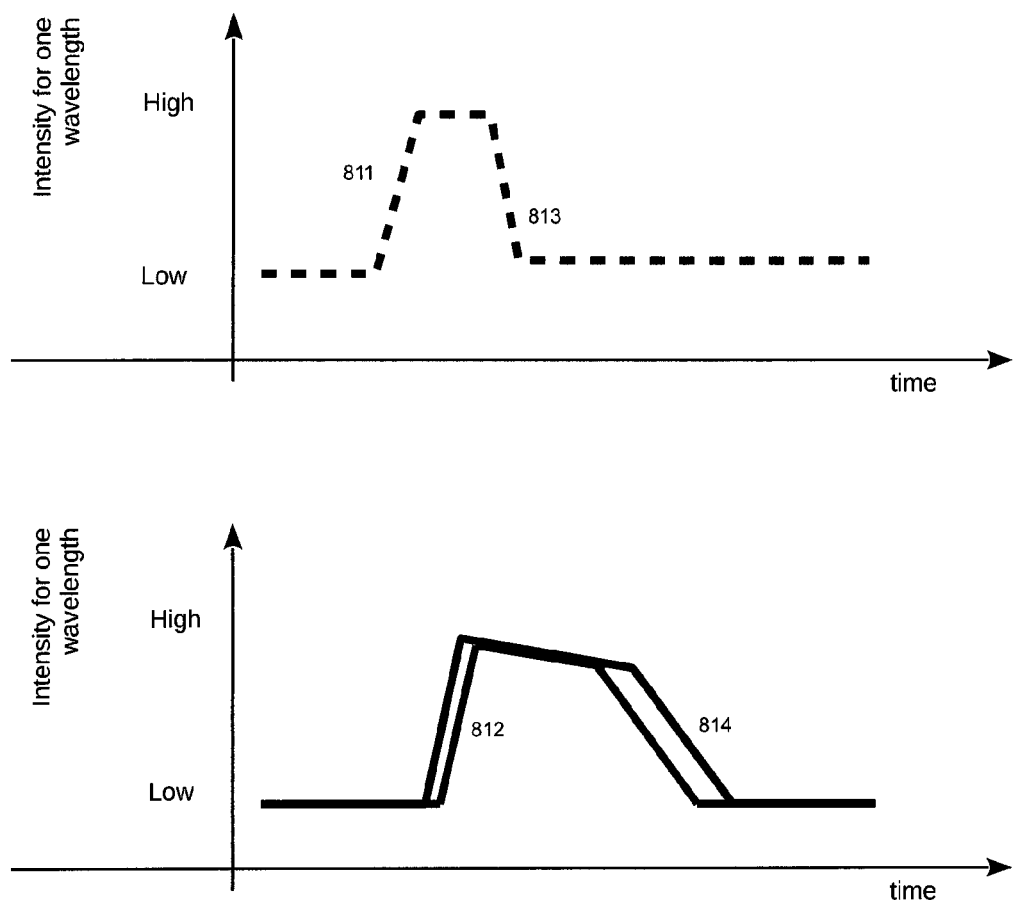
Figure 8.1

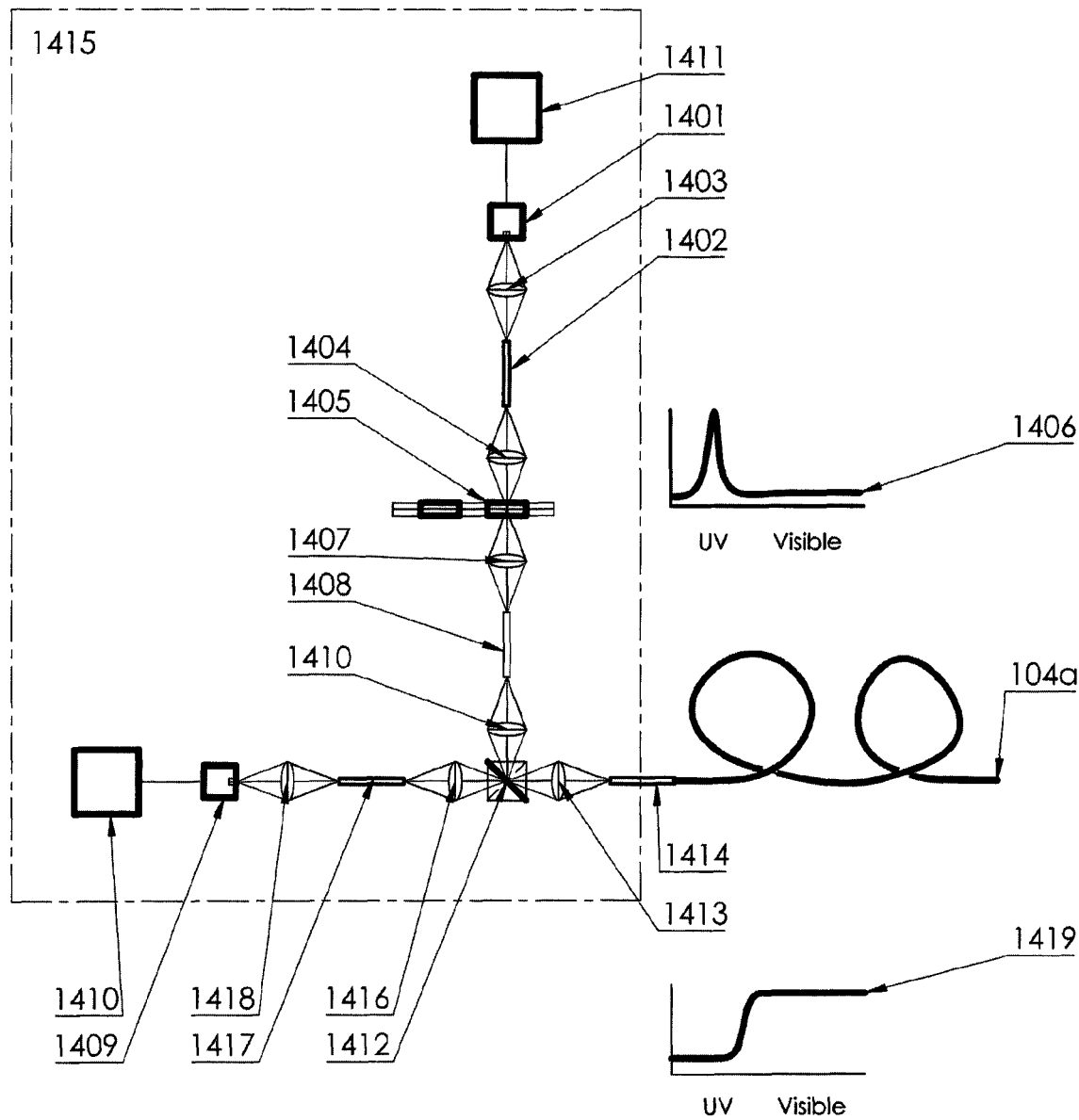
Figure 12.1

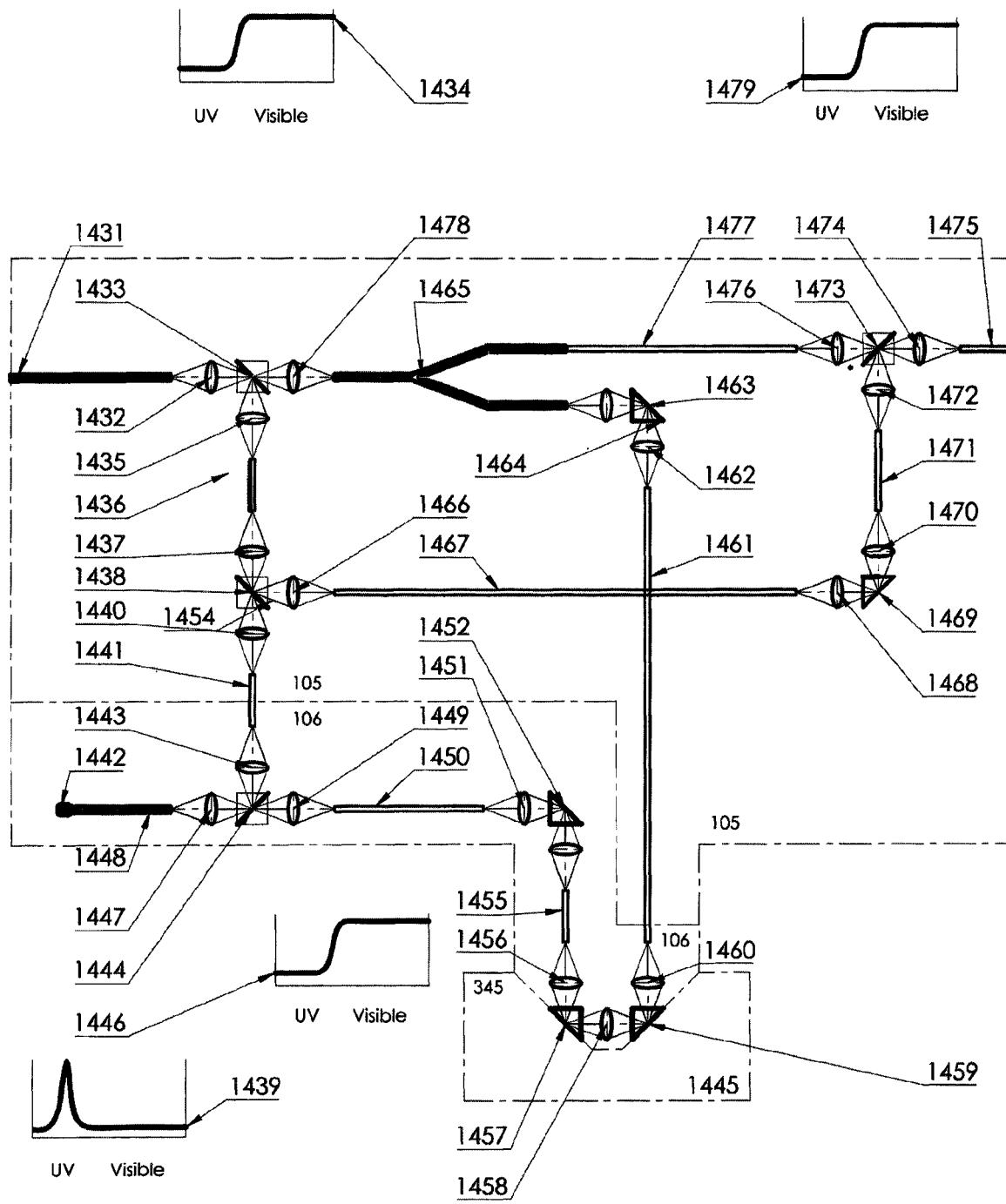
Figure 12.2

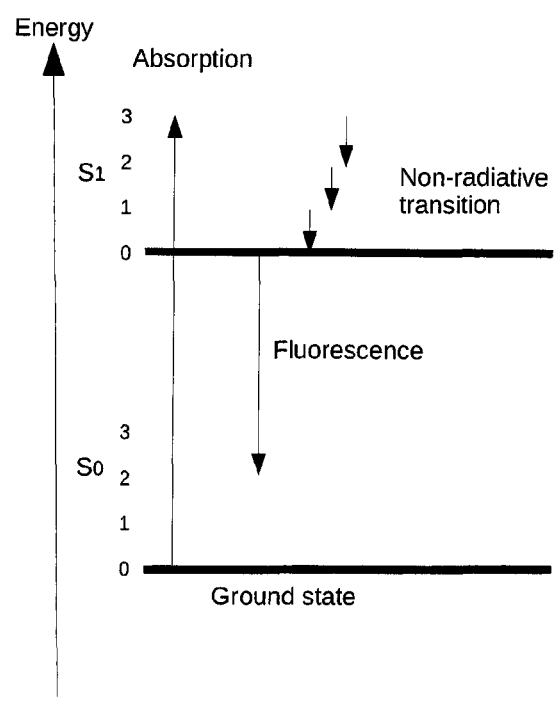
Figure 13.1

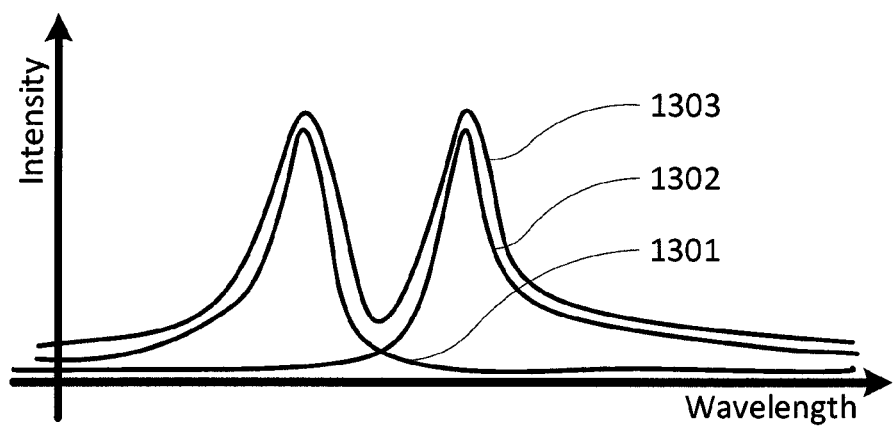
Figure 13.2
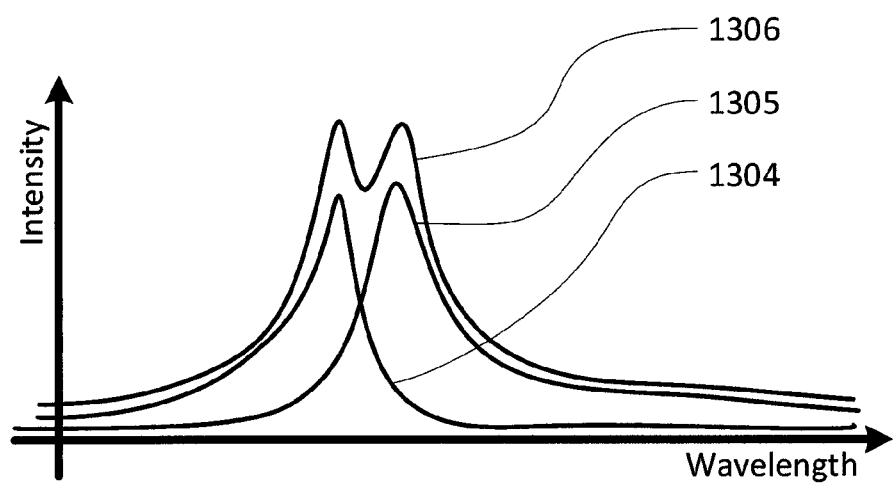
Figure 13.3

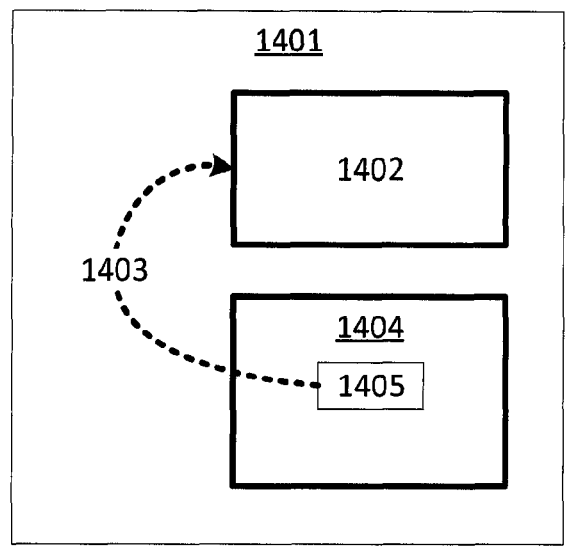
Figure 14.1
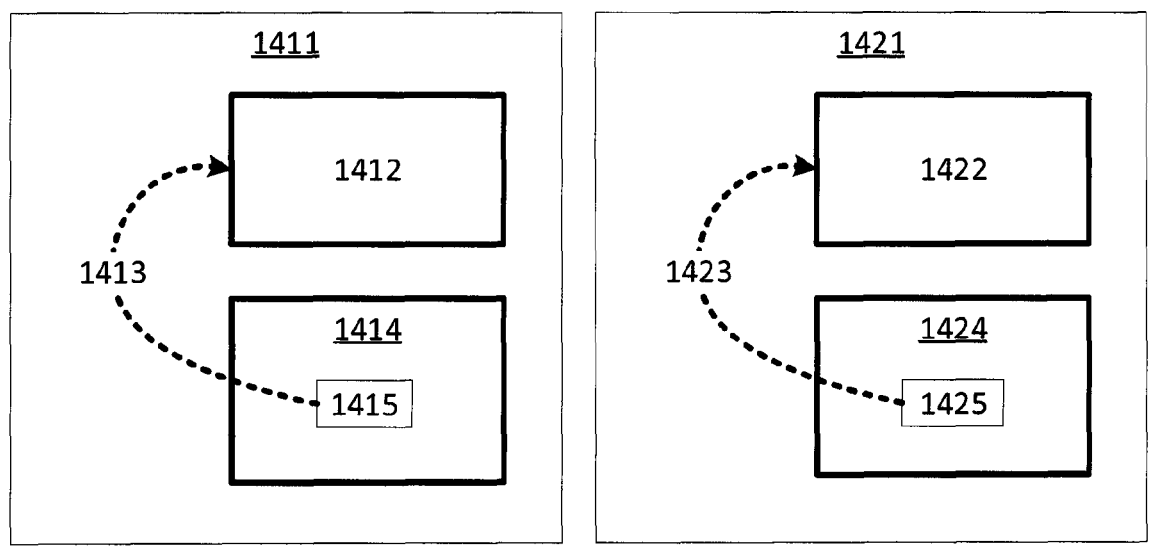
Figure 14.2

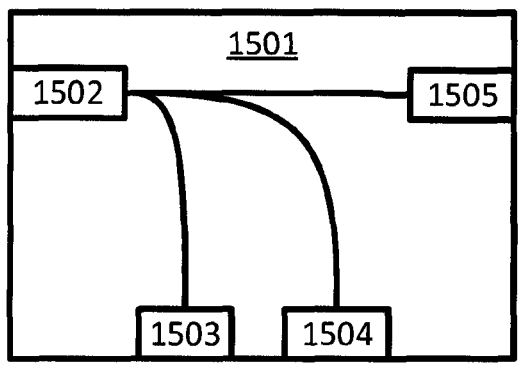
Figure 15.1
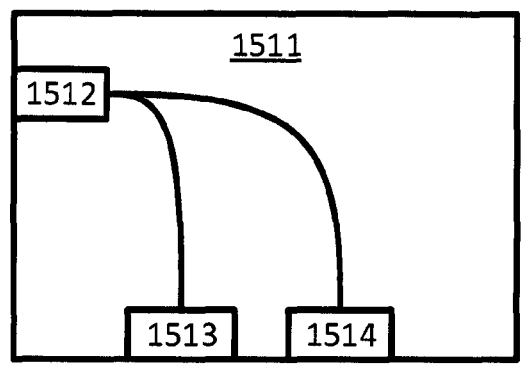
Figure 15.2
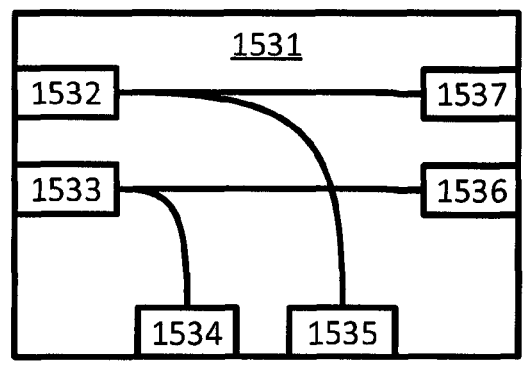
Figure 15.3
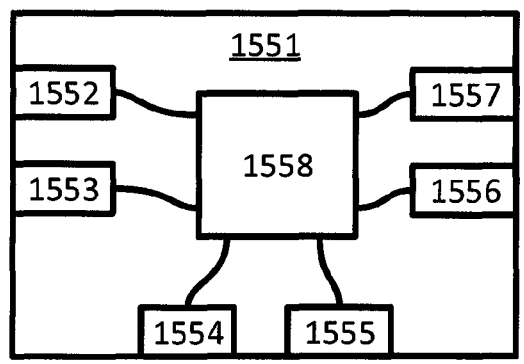
Figure 15.4

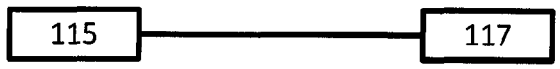
Figure 18.1
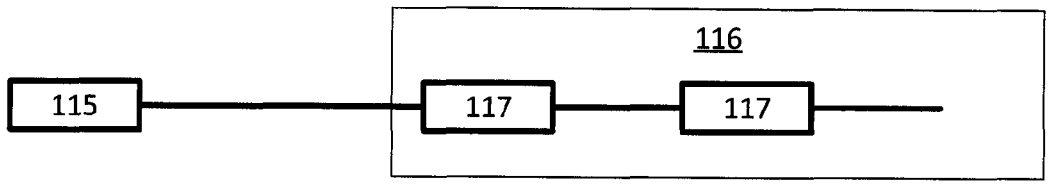
Figure 18.2
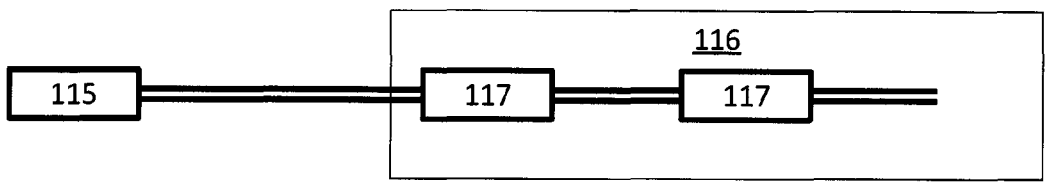
Figure 18.3
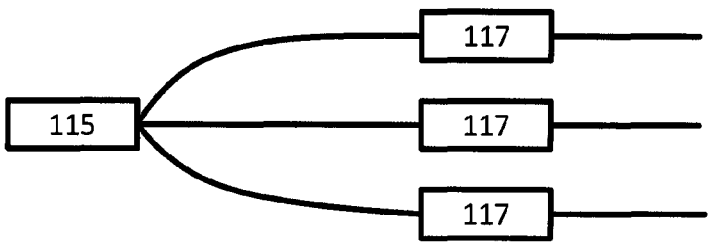
Figure 18.4
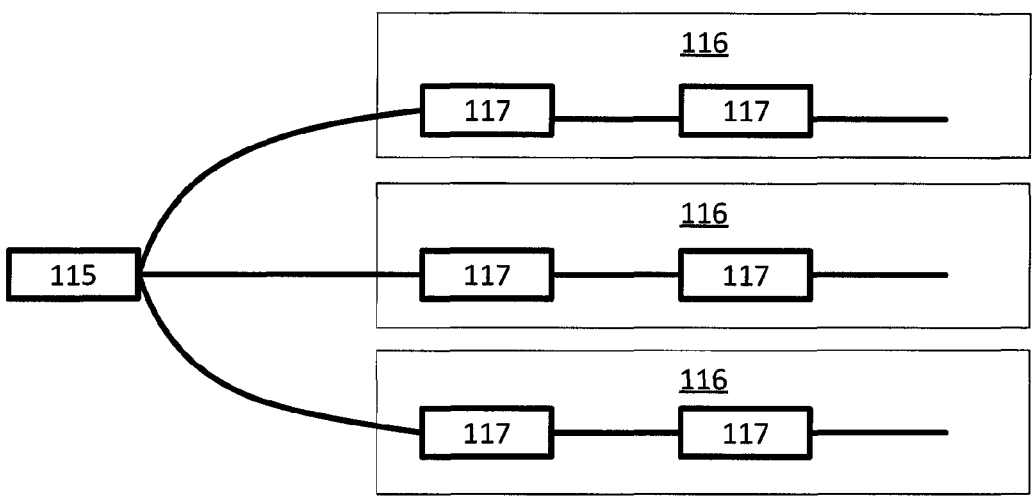
Figure 18.5

Figure 20.1
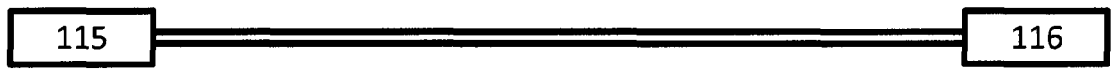
Figure 20.2
Figure 20.3
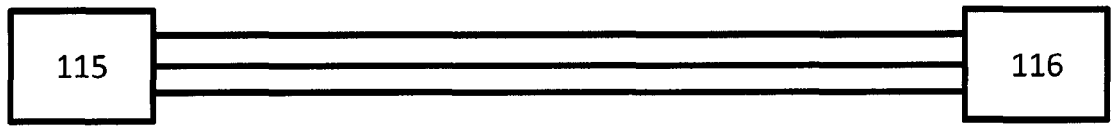
Figure 20.4
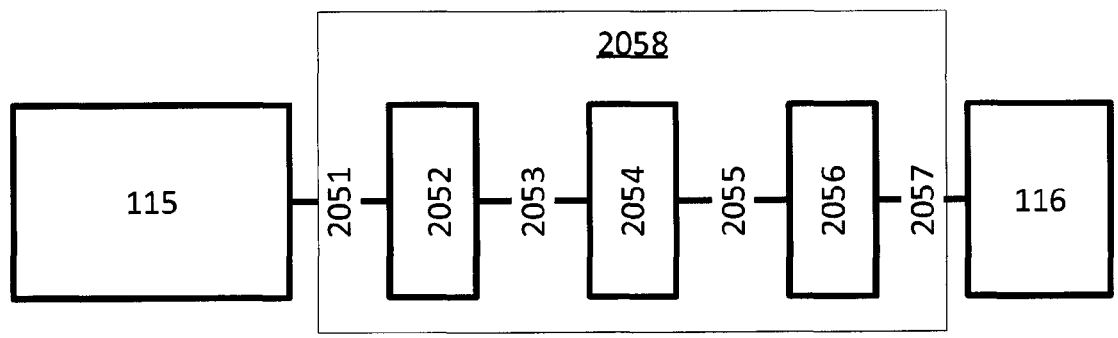
Figure 20.5

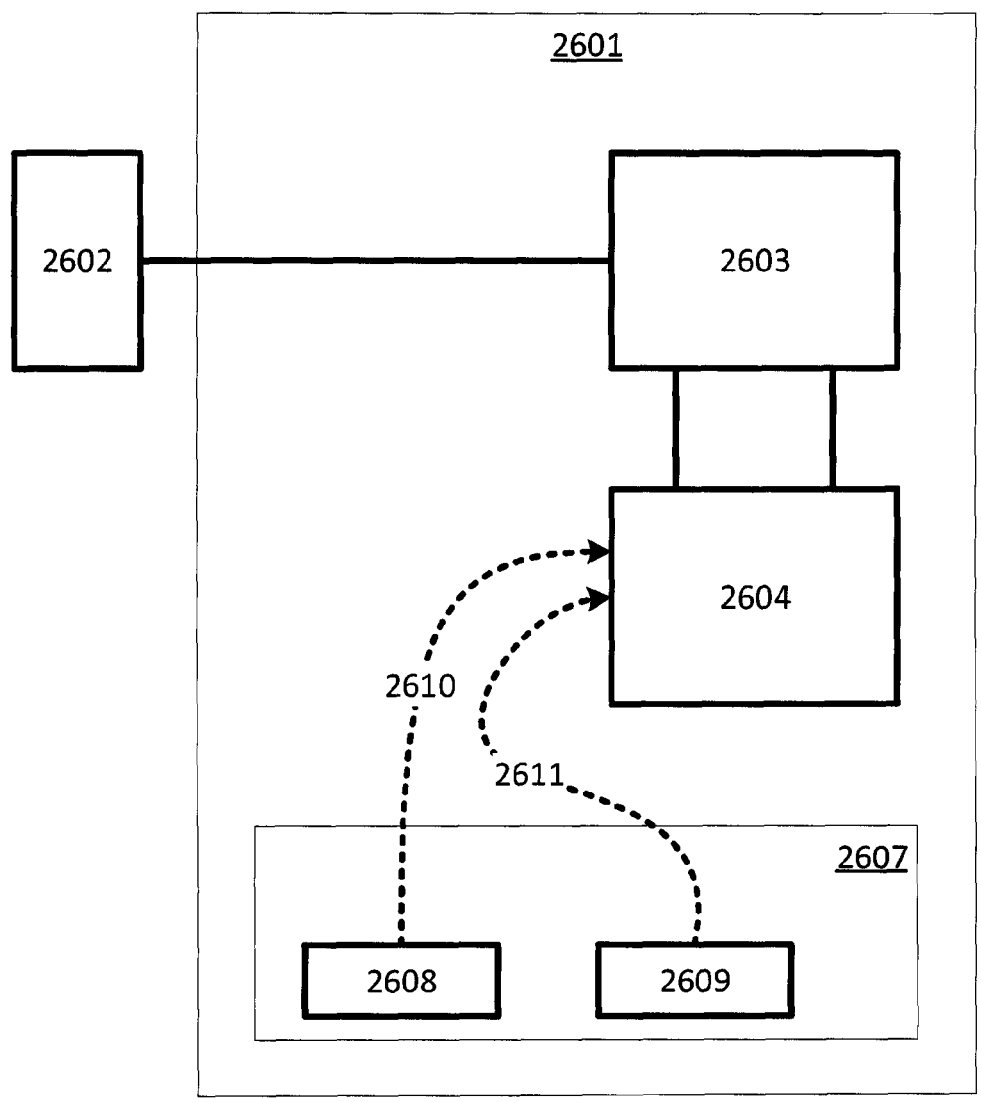
Figure 26.1

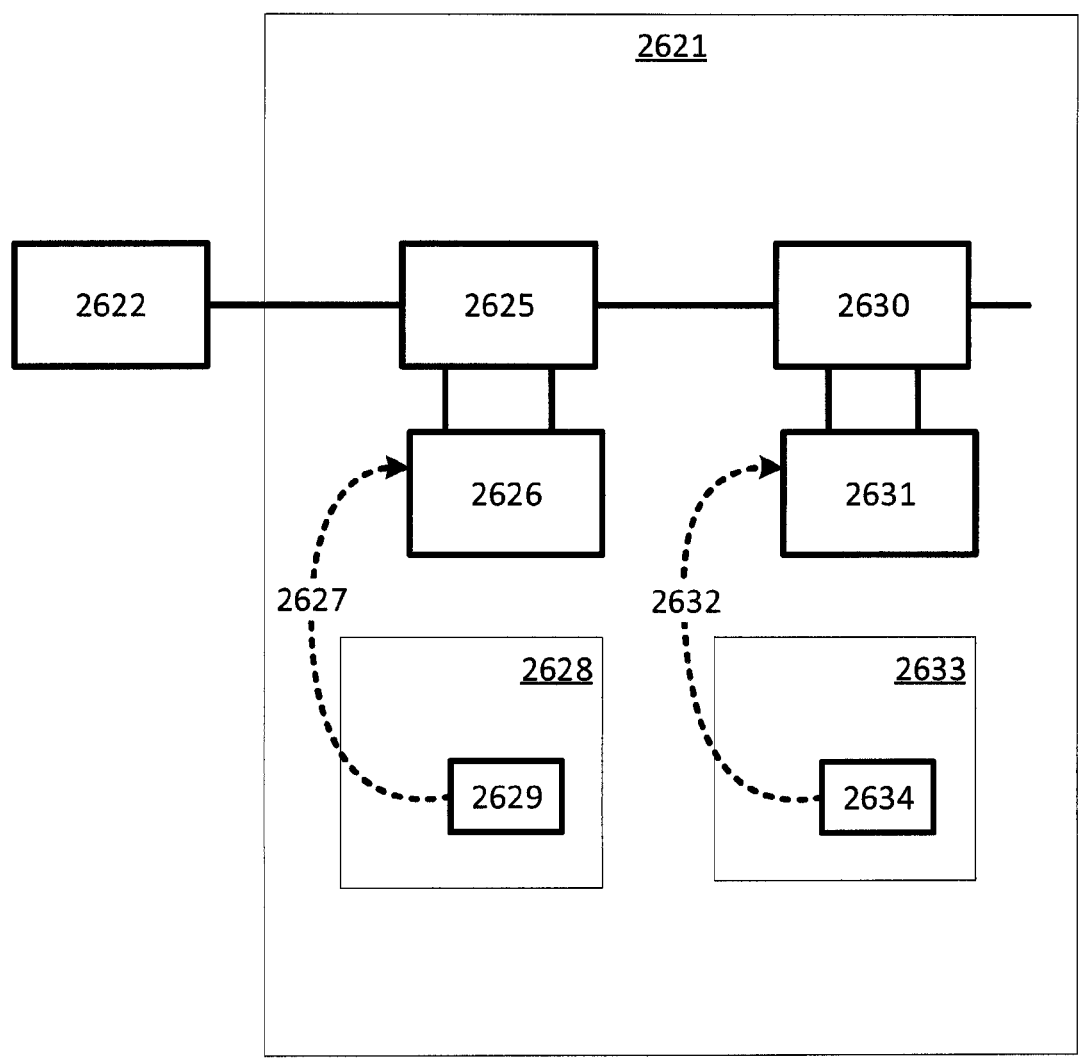
Figure 26.2

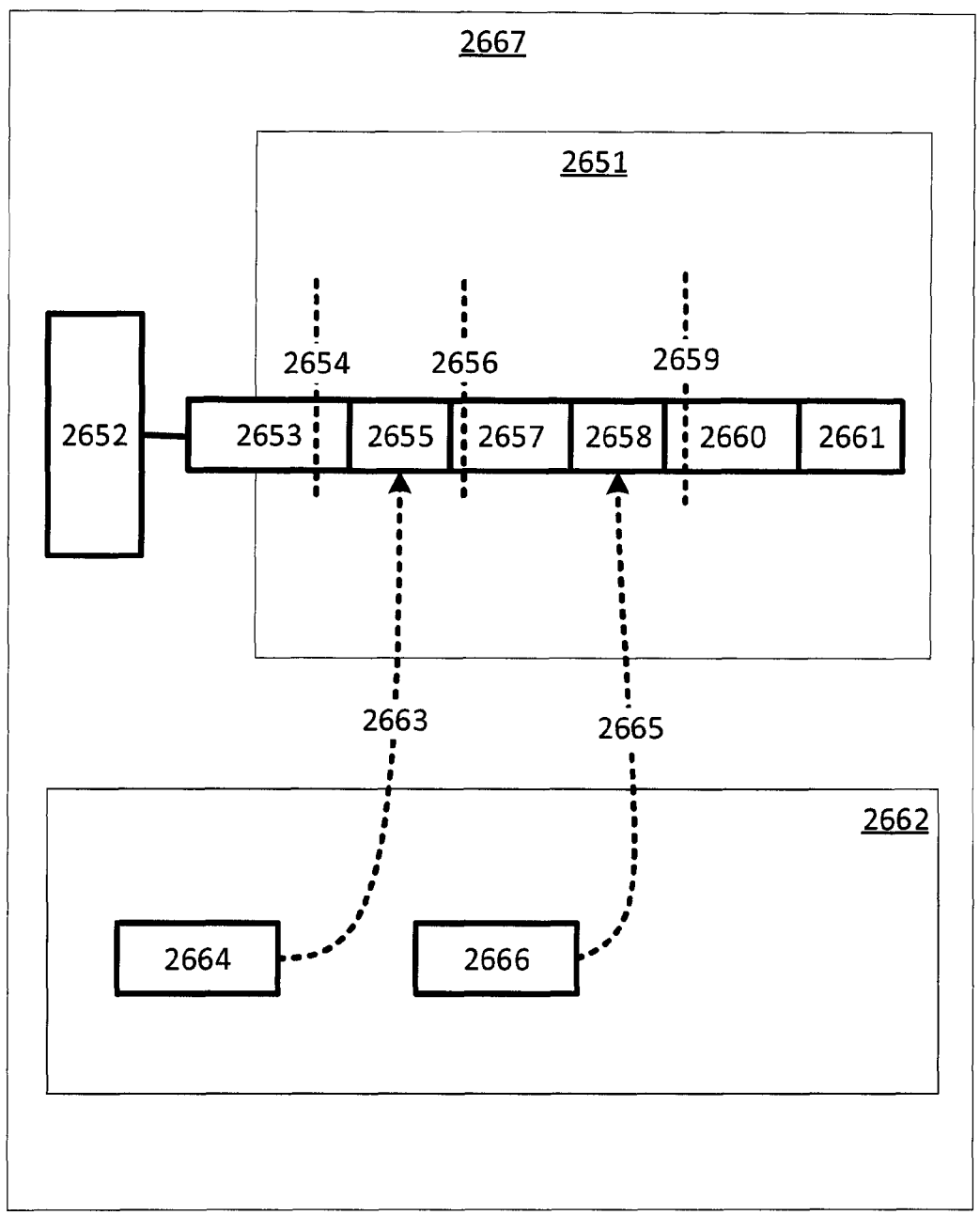
Figure 26.3

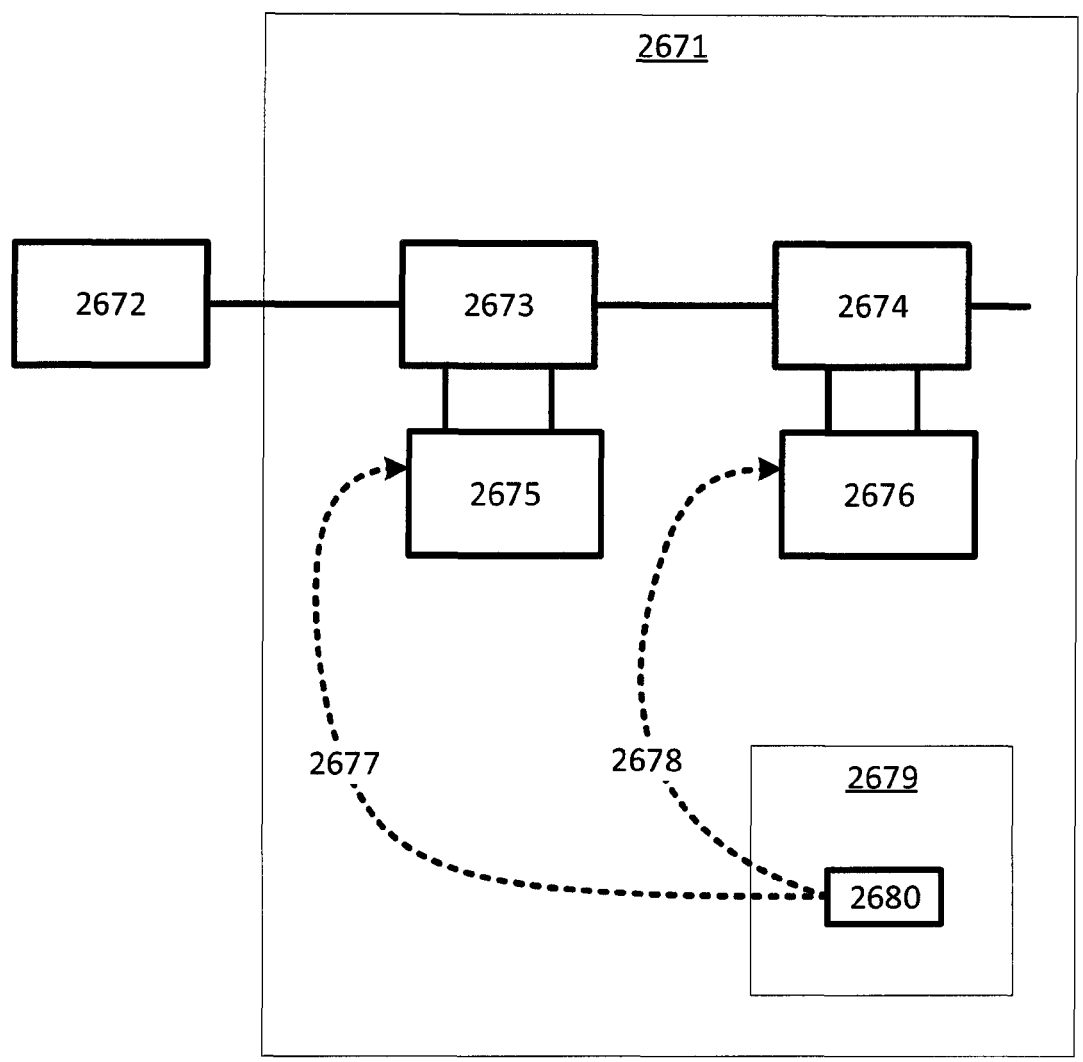
Figure 26.4

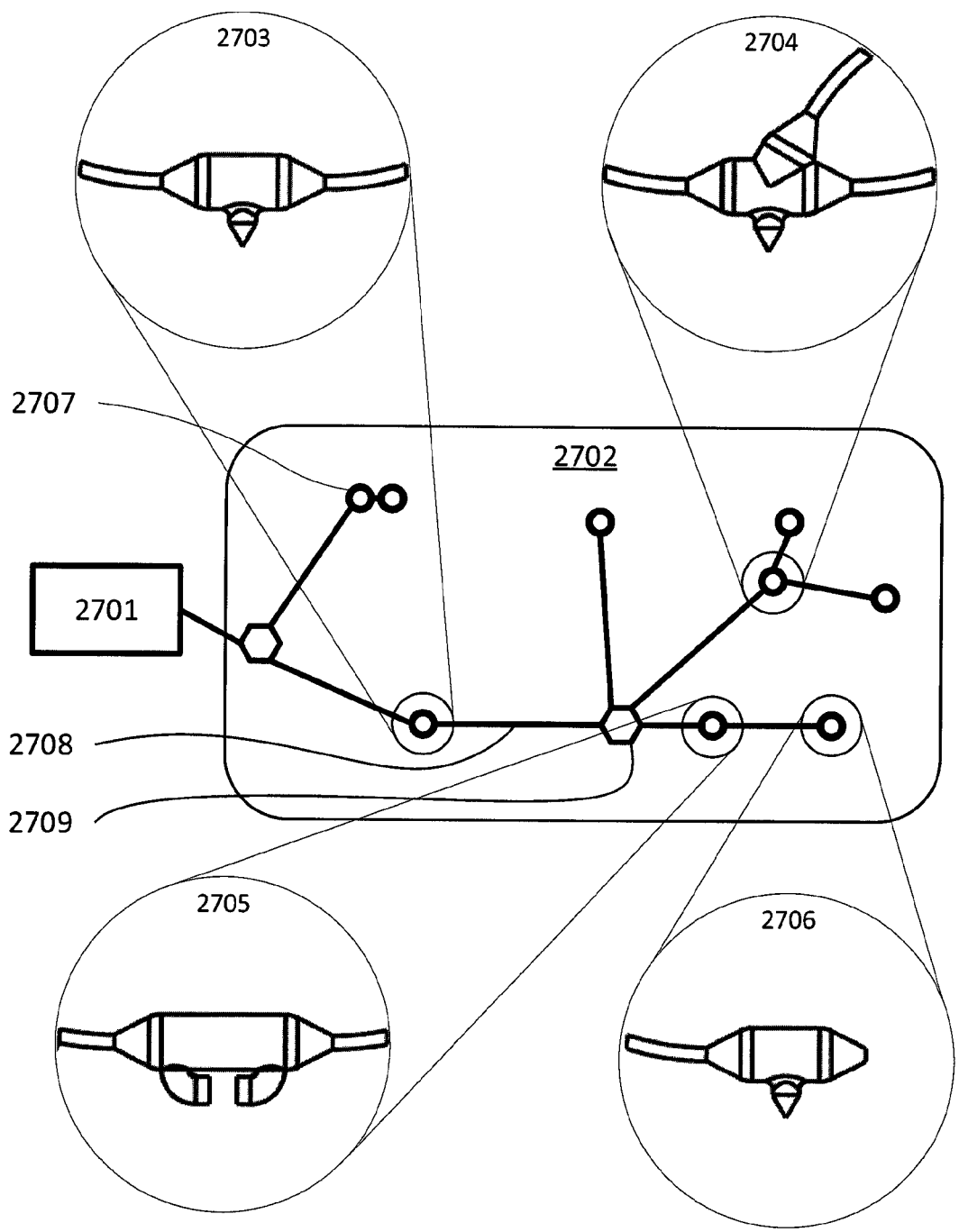
Figure 27.1

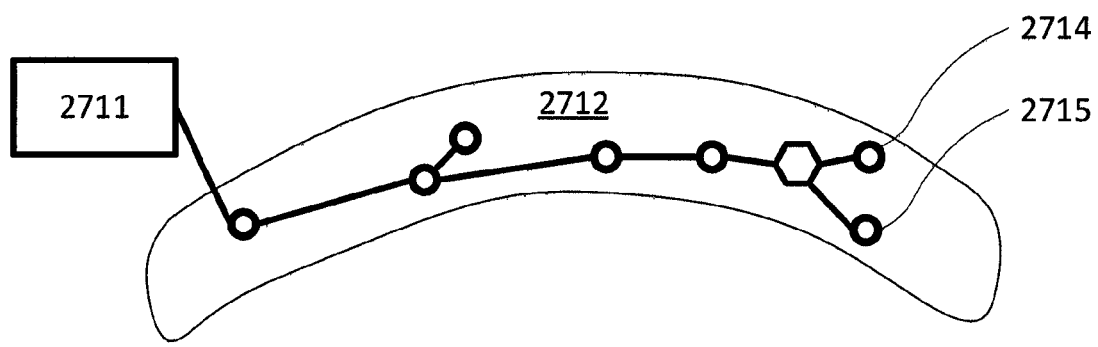
Figure 27.2
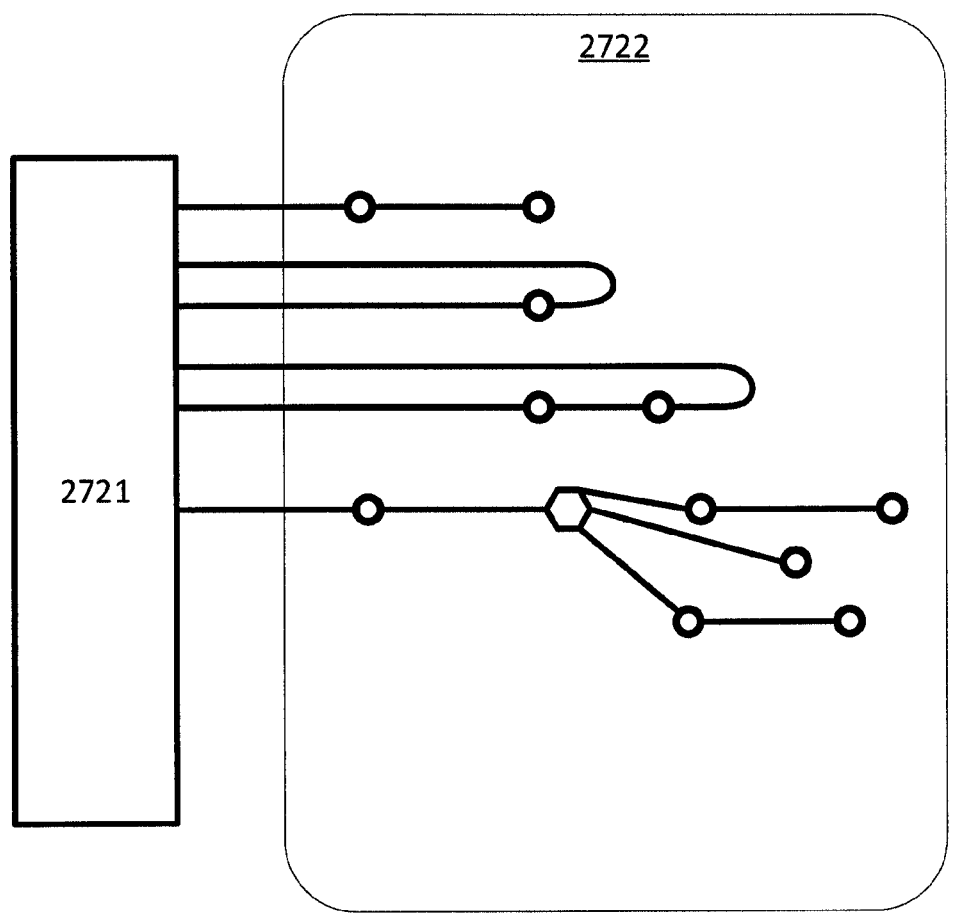
Figure 27.3

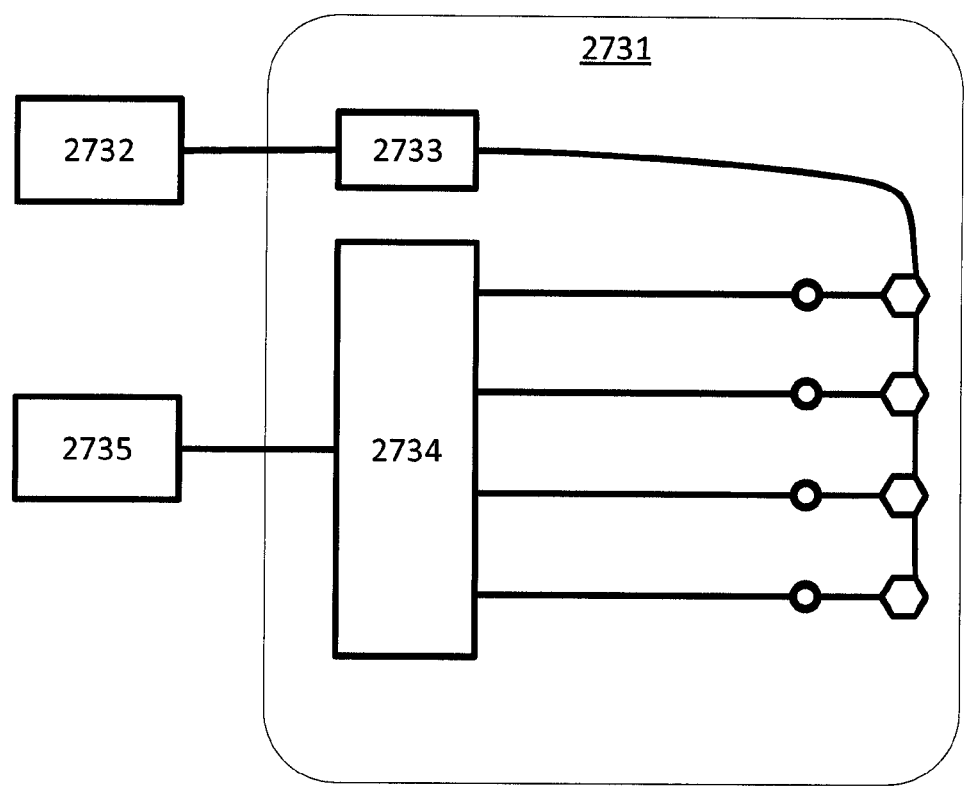
Figure 27.4

DEVICE FOR MEASURING A PROPERTY OF A MEASUREMENT OBJECT BY LUMINESCENCE

FIELD OF INVENTION

The present invention relates to a measurement technique utilizing optical devices for at least a part of the measurement device.

BACKGROUND

Measurement of a property of a measurement object is required in many technical fields. Such properties may be measured by electrical measurement methods.

In many technical areas, the use of electric measurement methods may be difficult, for example in areas having large electrical or magnetical disturbances or areas having high moisture or high temperatures.

Optical measurement technics may be used in such difficult areas. Examples of measurement areas wherein optical measurement methods are beneficial are:

1) Medical appliances, in which electrical interaction is non-desirable;
2) Monitoring of buildings and infrastructure, such as temperature, moisture, loads, fire alarm, smoke;
3) Hazard areas such as watercrafts, petrochemical industries, nuclear power plants having high demands on fire hazards;
4) Mobile telephones in which small components are beneficial;
5) Clothing and bodywear;
6) Measurement of high temperatures and moisture;

A conventional optical measurement device may comprise a source of light driven by electrical power provided by, for example batteries or the line voltage. The light is transmitted to an optical sensor via an optical fiber. The optical sensor is influenced by a measurement object, for example reflected, resulting in an optical signal, which is transmitted to a detector via an optical fiber, which may be the same optical fiber as mentioned above. The detector converts the optical signal to an electrical signal, which is processed by a computer. The optical fiber may be long, so that any electrical devices are positioned remote from the measurement object. See for example the patent publication WO2013/147670A1.

It may be desired to measure several measurement object properties at the same time by several optical sensors. If measurement environment is remote and difficult to access, the optical sensor should be passive. There is required a selection method in order to access the optical sensors separately, simultaneously or in sequence.

SUMMARY OF THE INVENTION

Accordingly, an object of the present invention is to mitigate, alleviate or eliminate one or more of the above-identified and below mentioned deficiencies and disadvantages singly or in any combination.

In an aspect, there is provided a device for monitoring a measurement object. The device comprises an active unit having a light source emitting light with a wavelength spectrum and an optical detector. The device further comprises at least one passive unit and an optical link for passing the emitted light from the light source to the passive unit. Each passive unit comprises a sensor and a selector for diverting at least a portion of the emitted light to the sensor. The sensor comprises a luminescent material being directly or indirectly affected by the emitted light being diverted by the selector. The light source emits light in a wavelength emission spectrum, such as UV light, that directly or indirectly affects said luminescent material and said luminescent material radiates light in a radiated wavelength spectrum, such as visible light, when being directly or indirectly affected by said emitted light. The sensor is arranged to be sensitive to an external influence by the measurement object for producing a modulated signal during the external influence, which modulated signal is passed to the detector.

The light source optionally emits light, comprising for example NIR light, which stimulates a charged particle generator in the passive unit to produce charged particles. Such charged particles may create currents and electric fields. Such charged particles may be electrons, ions or plasma.

The sensor comprises at least one luminescent material, for example a fluorescent material. Alternative or additionally the luminescent material may generate light by exposure to charged particles produced by the charged particle generator In an embodiment, the selector comprises: an optical device for diverting a portion of the light received from the optical link to the passive unit; and a fixed filter for passing at least at least a portion of said emitted light to said sensor.

In another embodiment, the active unit may comprise an optical transmission filter having an adjustable UV passband filter arranged to transmit UV light at a plurality of different wavelength spectra, such as 200 nm-250 nm; 250 nm-300 nm; 300 nm-350 nm; and 350 nm-400 nm or any combination thereof.

In a further embodiment, the active unit may comprise an optical receiver filter, which is arranged before the optical detector. In a still other embodiment, the device may further comprise a control processor for controlling at least one of: the light source, the optical detector, the optional optical transmission filter and the optional optical receiver filter and optionally the optical multiplexer.

The device may further comprise a real-time processor receiving information from the optical detector.

The real-time processor may perform fast filtering, such as filtering of detected signals, thereby reducing interaction from surrounding environment. One way of filtering is to use correlation filters, for example when detected signals are correlated with the control signals sent by the control processor to the light source.

The device may further comprise an information result processor receiving information from the real-time processor, optionally receiving logged information, optionally receiving result definition defining some algorithms regarding processing in the real-time processor for passing information to result output used for presenting the information to a user.

The device may further comprise result definitions, input by a user and passed to the result processor.

The passive unit may further comprise a stop filter for preventing light from reaching the measurement object.

The passive unit may further comprise a stop filter for preventing light from reaching the volume where the external influence affect the modulated signal.

The device may further comprise means for calibration of the sensor.

BRIEF DESCRIPTION OF THE DRAWINGS

Further objects, features and advantages of the invention will become apparent from the following detailed description of embodiments of the invention with reference to the drawings, in which:

FIG. 2.1 is block diagram of a light source of the embodiment according to FIG. 1.

FIG. 2.2 is a block diagram of a selector of the embodiment according to FIG. 1

FIG. 2.3 is a block diagram of a detector of the embodiment according to FIG. 1.

FIG. 3.1 is a block diagram of a sensor of the embodiment according to FIG. 1.

FIG. 3.2 is a block diagram of another sensor of the embodiment according to FIG. 1.

FIGS. 4.1, 4.2 and 4.3 are spectra of light emitted by the light source when passed to optical multiplexer.

FIGS. 5.1, 5.2 and 5.3 are spectra of light received by a selector and passed by the selector of the embodiment according to FIG. 2.2.

FIGS. 6.1 and 6.2 are spectra or visible light received by a detector of the embodiment according to FIG. 1.

FIGS. 7.1, 7.2 and 7.3 are light received and radiated by the sensor of the embodiment according to FIG. 3.1.

FIG. 8.1 is a time diagram of exciting light and radiated light of a luminescent material of the embodiment according to FIG. 1.

FIGS. 12.1 and 12.2 are schematic diagrams of another embodiment of the invention.

FIG. 13.1 is a Jablonsky diagram explaining fluorescence.

FIGS. 13.2 and 13.3 are diagrams showing spectra of UV-light intensity over wavelength.

FIGS. 14.1 and 14.2 are schematic block schemas showing the external influence.

FIGS. 15.1 to 15.4 are schematic block schemas showing selector configurations.

FIGS. 18.1 to 18.5 are block schemas of different embodiments of groups of passive units.

FIGS. 20.1 to 20.5 are block schemas of embodiments of an optical link.

FIGS. 26.1 to 26.4 are a block schemas of embodiments of a passive units having two external influences.

FIGS. 27.1 to 27.4 are plan views and side views of a sensor layer to be arranged in a dressing.

DETAILED DESCRIPTION OF EMBODIMENTS

Below, several embodiments of the invention will be described. These embodiments are described in illustrating purpose in order to enable a skilled person to carry out the invention and to disclose the best mode. However, such embodiments do not limit the scope of the invention. Moreover, certain combinations of features are shown and discussed. However, other combinations of the different features are possible within the scope of the invention.

Figure 1:
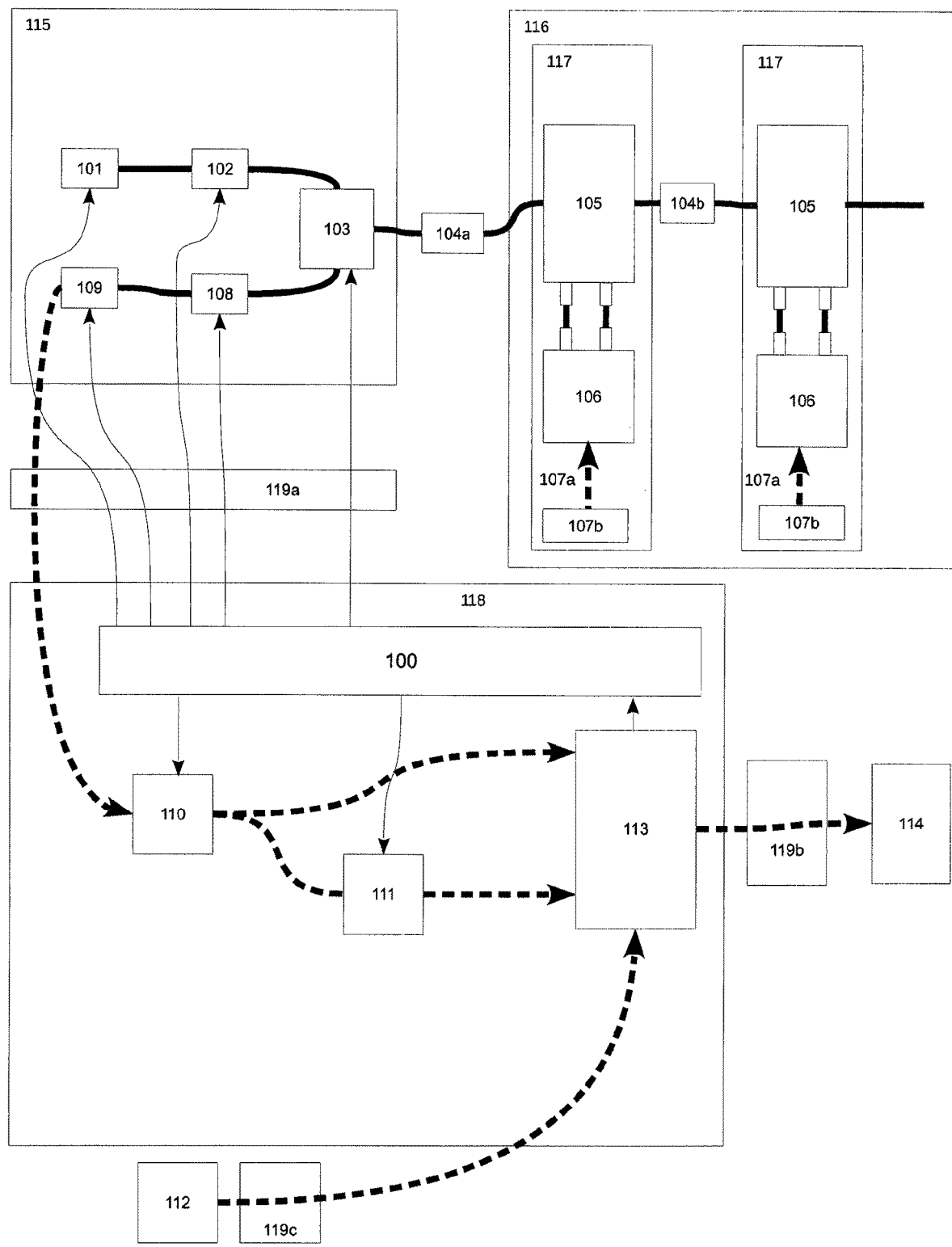
FIG. 1 is a block diagram of a first embodiment of the present invention.

FIG. 1 shows an embodiment comprising an active unit 115, several passive units 117 arranged in a group of passive units 116, a control unit 118, result definition 112, result output 114 and optional wireless transmissions 119a, 119b and 119c.

The active unit 115 is connected to electric power, such as the line voltage, or stored chemical energy convertible to electric energy, such as batteries. The active unit 115 together with the control unit 118 are both used multiple times and may in some embodiments be complex and expensive.

In some embodiments, the passive units 117 are less expensive and used a single time and then discarded, such as blood detection devices, skin dressing devices and medical devices outside the body.

In other embodiment both the active and passive unit may be less expensive, such as mobile phone devices and automotive devices.

In other embodiment both the active and passive unit may be expensive, such as medical devices inside body, electric devices, power cables devices, electronic devices, hazard area devices and airborne devices.

The active unit 115 comprises a light source 101, an optical transmission filter 102 and an optical multiplexer 103. Furthermore, the active unit comprises an optical detector 109 and an optical receiver filter 108.

The light source 101 emits light in the UV wavelength spectrum. The light source is connected to the optical transmission filter 102 via an optical path, shown by a solid bold line in FIG. 1.

In another embodiment, the light source 101 additionally emits light in the NIR wavelength spectrum.

In another embodiment, the light source 101 is adjustable and may be adjusted to emit UV and/or NIR light with at least two different predetermined UV and/or NIR light wavelength spectra under the control of a control processor 100.

The light source may be arranged to deliver the light continuously. Alternatively, the light source delivers the light at the demand of a control computer during an on-time period, for example during a short time period of a few seconds. The time period may be separated by off-periods, for example of equal length as the on-period. The light may be delivered in short pulses with a duration of 1 ns to 100 µs, for example produced by a Q-switch.

The optical transmission filter 102 is arranged to pass light with a predetermined UV wavelength spectrum. The optical transmission filter 102 may be adjustable and may be adjusted to pass UV light with at least two different predetermined UV wavelength spectra under the control of a control processor 100. Alternatively or additionally, the optical transmission filter 102 may be adjustable and may be adjusted to pass NIR light with at least two different predetermined NIR wavelength spectra under the control of the control processor 100.

The UV and/or NIR light passed by the optical transmission filter 102 is passed via an optical path to the optical multiplexer 103, which passes UV and/or NIR light further on to an optical link 104a out of the active unit 115. The light at optical link 104a may be a combination of the different spectra. Alternatively, the light at optical link 104a is a single spectrum at each time, whereby different spectra are transmitted to the optical link 104*a* at different times.

The optical link 104*a* connects the active unit 115 with at least one passive unit 117. The passive units 117 may be arranged in groups of passive units 116, wherein each group of passive units comprises at least one but often several passive units 117 interconnected by optical links 104*b*.

In other embodiments, a plurality of "groups of passive units" 116 may be used, where for each group, a separate optical link 104*a* is connecting said group to the optical multiplexer 103 in the active unit 115.

In FIG. 1, the control signal path from control processor 100 connected to optical multiplexer 103 may be inactive. However, in another embodiment, the control processor 100 may pass a control signal to optical multiplexer 103, selecting a light passing through one of several optical links 104*a*, where each optical link 104*a* is connected to several "groups of passive units" 116.

Each passive unit 117 comprises a selector 105 which selects at least one UV and/or NIR wavelength spectrum passed by the optical transmission filter 102. Each spectrum is tailored to be selected by a corresponding passive unit selector 105. The same predetermined UV and/or NIR spectrum may be selected by two or more passive unit selectors 105. Each passive unit selector may select a single or several of the predetermined UV and/or NIR spectra. There may be two or several selectors in each passive unit.

The UV spectrum selected by the selector 105 is passed to a sensor 106 via an optical path. The sensor comprises a fluorescent material 106, which is activated by the UV light in order to radiate fluorescent visible light in all directions. A filter 203 (see FIG. 2.2) is arranged to prevent transmission of visible light back to the selector the same way as the UV light was transmitted to the sensor.

In another embodiment said selection can, when a active unit 115 passes UV light to a passive unit 117 with a selector 105 and a sensor 106 including fluorescent material 332, 342, 905, 1002, 1107 be performed as a combination with at least one component of: from the active unit 115 received UV light spectrum sent further to said selector 105; in said selector 105 UV light filter 203 passing a portion of received light further on to the said sensor 106; UV light wavelength sensitivity in a fluorescent material 332, 342, 905, 1002, 1107; a time delay 811 to 812; another time delay 813 to 814.

In another embodiment said selection can, when an active unit 115 passes light to a passive unit 117 with a selector 105 and a sensor 106 including a charged particle generator 1108 be performed as a combination with at least one component of: from the active unit 115 received light spectrum sent further to said selector 105; in said selector 105 a light filter 203 passing a portion of incident light further on to the said charged particle generator 1108; a light wavelength sensitivity in said charged particle generator 1108.

The radiated light is influenced by an external influence 107*a* produced by a measurement object 107*b*. The external influence 107*a* may be direct on the fluorescent material in sensor 106 for modulating the fluorescent light radiated by the fluorescent material.

Alternatively or additionally, the influence may be exerted on the fluorescent light, for example absorbing or reflecting the light, for directly modulating the radiated light.

Alternatively or additionally, the influence may be exerted on the UV-light received from the selector. The UV-light may be absorbed, reflected or scattered before excitation of the fluorescent material.

The radiated light may be modulated in amplitude and/or in wavelength and/or changed over time or polarization. The modulated light is passed back to the selector 105, for example via a separate return optical path. The selector 105 passes the modulated light via the optical link 104*a* back to the active unit and the optical multiplexer 103. The optical multiplexer 103 passes the modulated light to the optical receiver filter 108 and further to the optical detector 109, which produces an electrical signal.

The detector may be at least one of: μPMT, micro Photomultiplyer Tube; MPPC, Multi-Pixel Photoc-Counter; CCD, Charge-Coupled Device; PD, Photo Detector.

Modulated optical signals sent from two different selectors 105, may in many ways overlap each other in portions of wavelengths or in portions of time intervals. The detector signal is transmitted to a real-time processor 110 in the control unit 118. The real-time processor 110 processes the detector signal and sends information to an information result processor 113, which produces a result output signal under the control of result definitions 112. The result output signal may be sent digitally to a user 114. The real-time processor also provides information to an information logger 111 for storage and later retrieval by the information result processor 113.

A control processor 100 is arranged to provide control signals to the light source 101, the optical transmission filter 102, the optical detector 109, the optical multiplexer 103 and the optical receiver filter 108 for control of the active unit 115. In addition, the control processor 100 provides control signals to the real-time processor 110 and the information logger 111. The control processor 100 receives information from the information result processor 113. Some or all of the components of the control unit 118 may be arranged in the same enclosure or location as the active unit.

Control processor 100 controls how the active unit 115 via the optical detector 109 selects detection of an optical signal and sends "quantity" information further on to the real-time processor 110. The Result definition 112 defines the information requested by a user, and other necessary information that the result processor 113 needs for handling the information flow.

The processors may evaluate the information from the detector in several ways, such as: a time dependent approach; a time filter; a frequency domain approach, for example Fast Fourier Transform; a geometric approach; a differential equation approach; a best fit related to models in any kind of geometry; an AI approach; a machine learning approach; an operator controlled approach; a fussy logic approach; a random approach. The evaluation may use any components like: optics, and/or electronics, microchips, and/or software. The evaluation may relate to information from one or several measurement objects.

The measurement object may be at least one of, or part of: a venous needle insertion area, a wound, above or below the skin, a mobile telephone, a clothing, body wear things, public environments, exercising tools, vehicles, inside human body, power production facilities, electric devices, electronic devices, production plants, power transmission paths, cables, tubes, batteries, buildings, concrete, structures, biological structures, underwater systems, information system devices, trucks, bearing, system with bearings, gear, ignition system, cars, motor bicycles, bicycles, airplanes, trains, tram, rocket, military flying objects, bullets, movable devices, smartphones, laptops, hazard volumes, places in risk for fire, places in risk for explosions, human vital organs, brain, heart, lungs, liver.

The measurement object property may be at least one of: absorbency, transmission, refraction index, temperature, gas concentrations etc., see further below.

The external influence may be at least one of: radiated light, radiated energy, temperature, gravitation field, acceleration, pressure, charged particles, atoms, ions, molecules, proteins, cells, matter in small volumes, current, electric field, magnetic field, magnetic flux density, etc.

The measurement output may be an optical signal produced by the external influence acting upon the luminescent material, the UV-light and/or the visible light, the amplitude, phase, polarization, wavelength forming a measure of the external influence. Alternatively or additionally, the measurement output may be an electric signal produced as a result of such optical signal. The measurement output may be a computer output after processing in one or several computers under any program.

Result definition 112 may include:

1. Calibration information which connects a quantity to quantifiable values for each sensor, such as corresponding to a temperature in the unit Celsius and/or a filling rate in percent;
2. How logging information should be calculated;
3. How signal alert and alarm is dependent of a filling rate;
4. How other variables are defined from information input by a user;
5. How processing of input information should be done for passing processed information further on to result output.

Information that is sent to Result output 114 may for example comprise:

1. Logging information of temperature for each measurement point;
2. Logging information of filling rate for each measurement point;
3. Logging information for other defined variables;
3. Signal alarm and warning.

The result definition 112 may be entered by an external keyboard or may be provided in advance or sent via a computer interface or sent by a wireless link 119c.

The control unit 118 may be arranged in the same enclosure as the active unit 115. Alternatively, the control unit 118 is connected to the active unit 115 via a wireless link 119a. Alternatively or additionally, a wireless link 119b may be arranged between the control unit 118 and the result output 114, which may be a mobile telephone and/or a user computer systems.

The different items mentioned above will be explained in further details below.

FIG. 2.1 shows a light source 101 having a plurality of internal light sources 101a, 101b, 101c, 101d and a multiplexer 221. The control processor selects one or several of the internal light sources at each time.

FIG. 2.2 shows a selector 105 in further details. The optical link 104a is connected to an optical path external light source interface 201. The received UV light is linked 209c to an interface 202 which passes the UV light to a pass filter 203, which is arranged to pass only UV light having a predetermined UV spectrum, corresponding to UV light passed by the optical transmission filter 102, as explained in further detail below. In addition, the pass filter 203 is arranged to prevent passage of visible light radiated by the fluorescent material. The UV light passing the pass filter 203 is passed to an interface 204 for passage to the fluorescent material.

Visible light radiated by the fluorescent material and modulated by the external influence is received by an interface 205 and passes an optional pass filter 206 arranged to pass only light of the wavelength spectrum radiated by the corresponding luminescent material, or as an option, only a portion of said spectrum. Thus, the pass filter 206 reduces other light wavelength, for example stray light. The modulated light is transmitted to an interface 207 and back to the interface 201 via optical path 209b. Stray light may also occur as fluorescent light from the optical fibers themselves. All optical components used should be arranged to not produce fluorescence, reflection or scattering, or otherwise produce or admit stray light.

UV light from the interface 201 is passed further in an optical path 209a to interface 208 for passage via at least one optical link 104b each connected to at least one of the passive units 117, if there is more than one passive unit. All features indicated for an optical link 104a is also applicable for optical link 104b.

Light from other combinations of interfaces may undesirable also pass light in the paths 210a, 210b and 210c. This effect can be reduced by optimizing the design of selector 105. One way of optimizing is to use mass produced polymer molded components.

FIG. 2.3 shows a detector 109 having a plurality of internal detectors 109a, 109b, 109c, 109d and a multiplexer 231.

FIG. 3.1 shows a sensor 106 and a measurement object 107b. The sensor 106 comprises an interface 331 for connection to interface 204 and an interface 338 for connection to interface 205. Interface 331 passes UV light to the fluorescent material 332 which radiates visible light to interface 333. A UV filter 334 is arranged to prevent UV light passing the fluorescent material 332 and further beyond the filter 334.

The radiated light passes through filter 334 to a transmission unit 336 and further to interface 338 and back to the selector interface 205.

The UV filter 334 is arranged for preventing UV light that has passed the fluorescent material from reaching the transmission unit 336, in which the UV light may cause unintentional modulation in the transmission unit 336.

The measurement object 107b comprises at least one property 325 which exert an external influence directly on the fluorescent material 332 as shown by information path 107a. The external influence may be oxygen molecules, which are fed to or surrounds the fluorescent material and quenches the radiation of the fluorescent material, which modulates and decreases its radiation of fluorescent visible light at increased oxygen concentration. The external influence can be temperature. Further alternatives may be pressure etc.

Alternatively, or additionally, the measurement object 107b comprises a at least one property 339 which exerts an external influence directly on the light which has been radiated by the fluorescent material 332 via the information path 107a'. The transmission unit 336 may be a probe arranged to measure electrical field. The light transmission of the probe is related to the electrical field at the probe, see for example the article "Distortion-free probes of electric field" by Vittorio Ferrari, published Jan. 8, 2018 by Nature Electronics ISSN 2520-1131 (online). The transmission unit 336 may measure absorbency via the external influence 107a'. Further alternatives may be scattering etc.

If direct modulation of the fluorescent material 332 is used according to arrow 107a, the transmission unit 336 may be omitted. On the other hand, if modulation of the radiated light is used by the transmission unit 336, any influence on the fluorescent material 332 according to arrow 107a should be minimized or known in advance.

The sensor 106 may be calibrated, such when there are no external influences 107a, 107a' at the fluorescent material 332 and the transmission unit 336.

The calibration may be stored by several processors 100, 110 and 113 and used later for correction of the detected signal.

FIG. 3.2 shows a further sensor arrangement which uses reflection for modulating the visible light. The UV light from interface 204 passes to an interface 341 and further to the fluorescent material 342, which radiates visible light. A optional filter 348 is arranged to block UV light from passing beyond the fluorescent material. The radiated visible light is passed via an interface 343 to a prism 344 which reflects the light back via interface 346 to selector interface 205 by total inner reflection, when the prism is surrounded by air. If the prism is surrounded by a fluid 345 as shown by arrow 107a″ from a source 347 of fluid, having higher refraction index, such as water, the total inner reflection ceases and the radiated visible light is modulated by the presence of the fluid. The prism may be a cone at the end of an optical fiber.

Further modifications of the devices and features mentioned above will become apparent below.

The light source 101 is arranged to generate UV light at several or at least one predetermined wavelength spectra. The light source may be arranged for emitting a broad spectrum of light from ultraviolet to infrared wavelengths. Such light sources emitting a broad spectrum of light are a mercury lamp which emit a large spectrum.

The optical transmission filter may be a polyester color filter through which the UV light is passing. The polyester color filter may be tailored to pass UV light of only one predetermined UV light spectrum. One example of such filter is a type of filter produced by GamColor, deep dyed polyester color. Another such a filter is "Dicronic filters for fluorescence imaging" marketed by Edmond optics.

The polyester and/or dicronic color filter is introduced in the path of the UV light by mechanical or electric means, such as a multiplexer and/or shut off gates controlled by the control processor 100.

The same polyester color filter and/or dicronic filter is used in the corresponding selector 105 as the UV light filter 203.

The same polyester color and/or dicronic filter is used in the corresponding sensor 106 as the UV light filter 334.

Each optical transmission filter may also use a plurality of combined effects, such as light pass through material, reflected light, optics like prisms, polarizers, diffractive and nanoscale optics, thin metal coatings, transparent materials, transparent paints, reflective paints, where each combination pass a portion of incident wavelength spectra further on.

A further alternative light source is several LED:s or laser diodes that emit light at different wavelengths.

A further alternative of changing the wavelength light spectra passed out from the active unit 101 is by using the control signal passed to the light source 101 for changing the internal temperature. Many light emitting components change emitted wavelength spectra when temperature change, especially laser diodes have this behavior. This side effect can be used for changing the wavelength spectra.

A further alternative for selecting wavelength sensitivity in the detector 109 is by controlling the temperature in said detector 109, such that temperature dependency is used.

The light emitted by the light source excites the fluorescent material. FIG. 13.1 shows a Jablonsky diagram explaining fluorescence. The fluorescent material absorbs a high-energy photon which moves an electron from a ground state S0 to a higher state S1. The system relaxes vibrationally, and eventually fluoresces at a longer wavelength. The fluorescence lifetime refers to the average time the molecule stays in its excited state before emitting a photon. The lifetime may range from 0.5 nanoseconds to 20 nanoseconds.

There are many fluorescent materials that can be used in the present context. A fluorophore is a fluorescent chemical compound that can re-emit light upon light excitation. Most fluorophores are organic small molecules of 20-100 atoms, but there are also much larger natural fluorophores that are proteins.

Fluorophores are used as a probe or indicator when its fluorescence is affected by environmental properties. Fluorophores may be embedded in a binder material to form a fluorescent material. Several different types of fluorophores may be arranged in the same binder material, for example one type radiating red light and one type radiating green light.

Fluorophores have maximum excitation and emission wavelength corresponding to a peak in the excitation and emission spectra. The maximum excitation spectrum ranges from about 325 nm to 600 nm and a few materials have still larger or smaller excitation wavelengths. The maximum emission wavelength ranges from 400 nm to 700 nm and shows very little dependence on the wavelength of excitation light. However, the energy of excitation light should normally be larger than the radiated light.

In the present specification, the light source should emit light that may excite the fluorescent material. In addition, different predetermined emitted UV wavelength spectra may be produced.

This may be done by LED:s, which are available and produce light from 240 nm. LED:s may produce ultraviolet light with narrow wavelength bandwidth.

An alternative light source is ultraviolet lasers that may produce light down to a wavelength of 126 nm.

A UV light source with more continuous spectrum is the xenon arc lamp and mercury-vapor lamp.

In the present context light means any electromagnetic energy having a wavelength between 50 nm and 15.000 nm. "UV light" means light having a wavelength of between 50 nm to 400 nm. "Visible light" means light with wavelength between 400 nm to 700 nm. "NIR light" (near infrared) means light having a wavelength of 700 nm to 1400 nm. "IR", infrared light means wavelengths from 1400 nm to 15.000 nm.

Since many or most fluorescent materials need ultraviolet light as emission light, the term "UV light" is used in the present specification for any light that can excite a corresponding fluorescent material. Since many fluorescent materials radiates visible light, the term "visible light" is used for any light radiated by the fluorescent material. "NIR light" is used in the present specification for excitation of a charged particle generator, but any light can used for such excitation. Visible light can be used instead of UV-light for excitation of a luminescent or fluorescent material. In addition, infrared or ultraviolet light may be used instead of visible light as emitted light from the luminescent or fluorescent material. Any light may be used for excitation of the charged particle generator, such as UV-light, visible light, NIR-light or IR-light.

A UV spectrum of a longer wavelength (350 nm-400 nm) may be used for exciting a fluorescent material that radiates visible light with a longer wavelength (red) and vice versa.

A "spectrum" is a plot of light intensity as a function of wavelength.

The light source 101 is emitting a plurality or at least one of different predetermined UV light spectra, which may be UV light with the wavelengths: 200 nm-250 nm; 250 nm-300 nm; 300 nm-350 nm; and/or 350 nm-400 nm.

Alternative or additionally the light source emits a plurality or at least one of different predetermined NIR wavelength light spectra.

Alternative or additionally the light source emits a plurality of different predetermined visible light spectra, for example used for tests, passed to user or other measurement tasks.

Such wavelength spectra may be produced by a broadband UV light source as shown in FIG. 4.1. The light emitted by the UV light source may be transmitted through a prism dividing the UV light source in the wavelength bands mentioned above. One predetermined wavelength spectrum is shown in FIG. 4.2. Another predetermined wavelength spectrum is shown in FIG. 4.3. In this embodiment with a prism, the optical transmission filter 102 is superfluous and may be omitted.

Another light source 101 may be several lasers, LED:s, fluorescent lamps 101*a*, 101*b*, 101*c*, 101*d* etc. each connected to the interface 221 also connected to the multiplexer 103 as shown in FIG. 2.1. The control processor 100 is arranged to activate the laser or LED corresponding to a desired predetermined wavelength spectrum, one at a time or several at a time.

Another detector 109 may internally use several detectors 109*a*, 109*b*, 109*c*, 109*d* each detecting a separate visible wavelength spectrum each connected to the interface 231 as shown in FIG. 2.3. The control processor 100 may be arranged to independently activate one or several of the detectors to a desired predetermined detecting wavelength spectrum. The electrical signal from each detector may one at a time or simultaneously be passed to the real-time processor 110.

FIGS. 5.1 and 5.3 illustrates two different predetermined wavelength spectrum emitted by the light source 101 and transmitted by the optical link 104*a* to a passive unit 117, whereby the selector 105 of the passive unit selects the corresponding predetermined wavelength spectrum. The light influences upon the corresponding luminescent material, which radiates visible light as shown in FIG. 5.2.

FIG. 6.1 illustrates the visible light received by optical receiver filter 108. Under control of the control processor, the receiver filter 108 filters out a portion of wavelength spectrum as shown in FIG. 6.2, which is passed to the detector. The receiver filter 108 passes a portion of the incident spectra further on to the detector 109, such that the intensity for each passed wavelength is lower than the incident intensity.

FIG. 7.1 illustrates the UV light received by the fluorescent material, which radiates visible light in a first spectrum according to FIG. 7.2. After passage of an absorbing material 336, or reflecting volumes (344 and 345) the radiated light has a decreased amplitude as shown in FIG. 7.3.

FIG. 8.1 illustrates for one of many UV stimulation wavelengths, how one of many radiated visible wavelengths by fluorescent material as function of time are delayed when illuminated by UV light. The figure is showing the principle of the effects, actual intensity and time scale are only schematic. When UV light stimuli increases 811, the time delay before visible light occur 812 is very short, typical scale 1 ns. When UV light stimuli decreases 813 the delay until intensity visible light is decreased to 1/10 is typical 20 ns 814. When a detector pass this information to the real processor 110 the time delay 811 to 812, and/or time delay 813 to 814 for at least one of UV wavelengths and for at least one of visible wavelengths, this information may be used for processing in the real-time processor 110 passing results further on. Any one of the two said delays, may be increased in the time frame, such as by adding phosphorescent and/or radioluminescent paint. The described effects when passed as optical signals to detector 109, can after the information is processed in real-time processor 110 be used for selecting optical signals from different passive units. When using this effect, the time delay from 813 to 814 is preferred, because this time delay is longer and therefore more easily detected.

The optical link 104*a* is a transmission link that can transmit light in both directions from the active unit 115 to one or several groups of passive units 116.

The optical link 104*b* is a transmission link that can transmit light in both directions from one passive unit 117 to another passive unit 117. It may be similar to the optical link 104*a*.

An example of the optical link 104*a*, 104*b* is an optical fiber or a bundle of optical fibers. Other examples are light tubes based on polymers that are stretchable. Such a tube may be biocompatible and may be implantable. Optical fibers may also be designed for handling high temperature and/or have chemical resistance such as for acids. Different kind of protections, such as for ambient light can be used.

An optical link length can be very short or very long. An example, is between 3 millimeter to 100 meters (and up to 100 km). A long optical link can be an optical fiber coiled as a spring, for being adjustable from 10% to 2000% of its nominal length. The spring may be flatted.

Other examples of an optical link is a volume filled with a fluid or gas. A typical volume can be a tube. Gas pressure is typical 1 bar, limited in the range 10^-12 bar to 500 bar.

Another example of the optical link 104*a*, 104*b* is a design preserving polarization when light is passed through, and/or a design effecting polarization when light is passed through, and/or a design effecting different optical modes when light is passed through, and/or a design where refractive index is different for different wavelengths.

Another example of an optical link 104*a*, 104*b* is when a plurality of the mentioned examples are combined, such as at least one of the mentioned ways are used.

An optical link may also be a ray of light passing in the air without any boundary.

An optical path may have a shorter length than the optical link. An optical path may be constructed to withstand high pressures, vibrations, electromagnetic radiation and/or energetic particles. The optical path may be a tube or a cavity, which may be filled with a plurality of transparent and/or reflective materials. The optical path may be an optical fiber. An optical path is arranged to transmit light between two or several locations.

Figure 9:
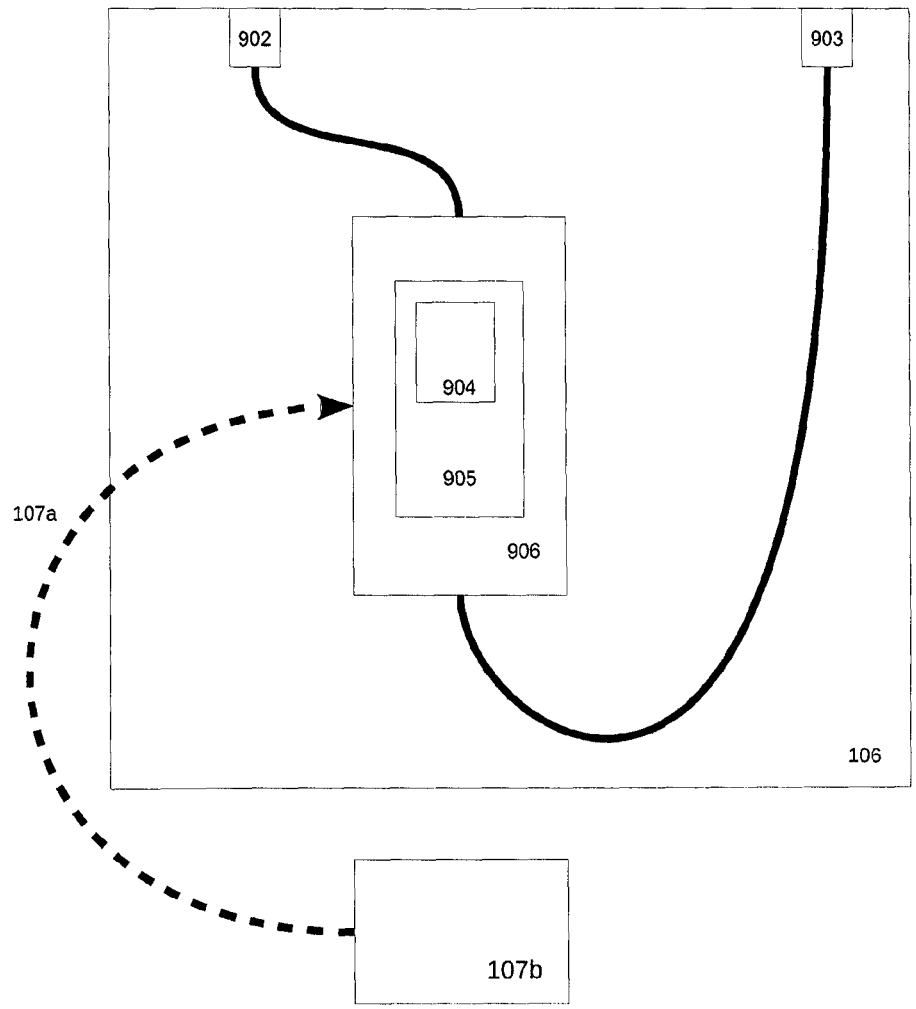
FIG. 9 is a block diagram of an embodiment of the sensor of the embodiment according to FIG. 3.1.

FIG. 9 shows a sensor comprising a sensor volume 906 in which a fluorescent material 905 is arranged. The fluorescent material comprises a plurality of fluorophores 904 suspended or divided within the fluorescent material 905. The external influence 107*a* may be a flow of gas or fluid passing the fluorescent material 905 and thereby directly influencing upon the radiation of visible light from the fluorescent material. The external influence can be a temperature existing in or conducted to the volume 906. The volume 906 can be very small or very large. UV light passes from interface 204 (see FIG. 2.2) to interface 902 and further to the volume 906. The visible light radiated by the fluorescent material is passed via interface 903 to interface 205.

Figure 10:
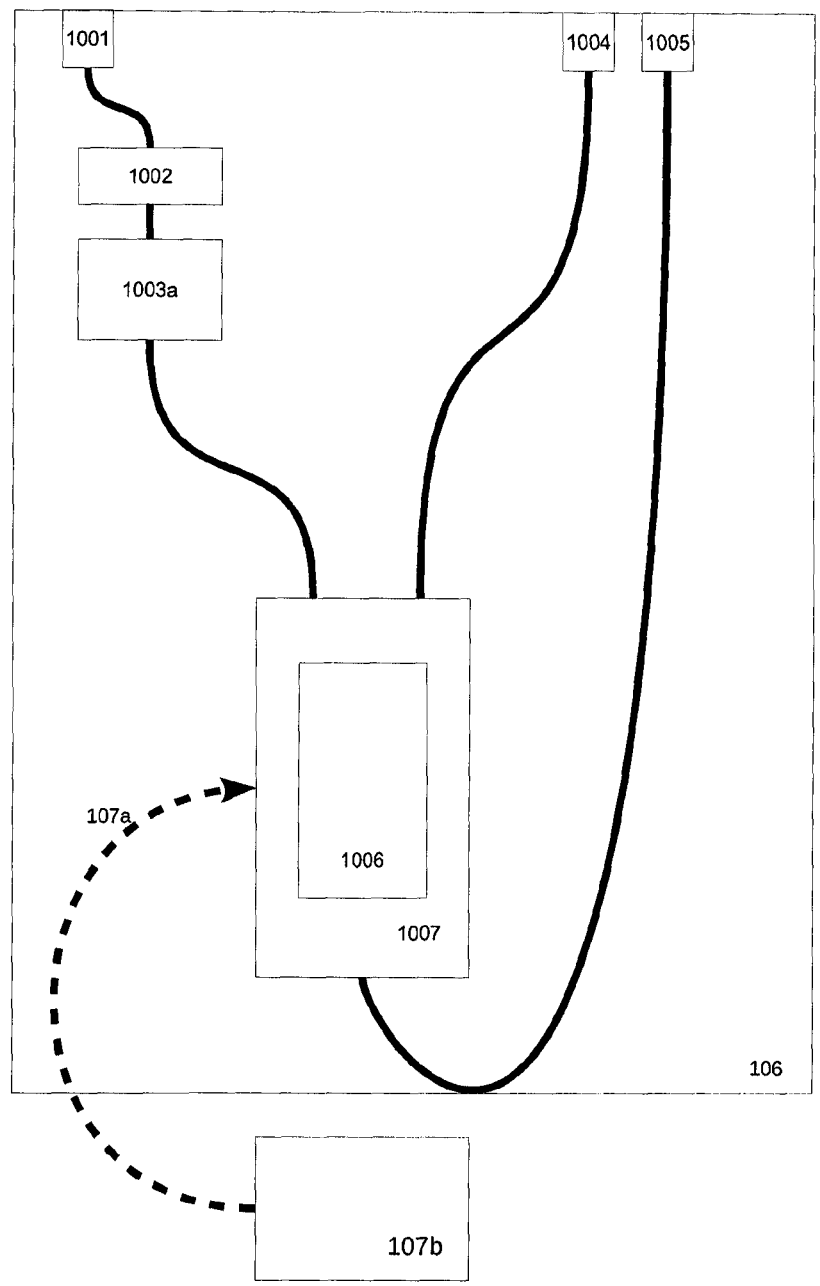
FIG. 10 is a block diagram of another embodiment of the sensor of the embodiment according to FIG. 3.1.

FIG. 10 shows the corresponding arrangement for absorption or reflection or scattering of the radiated light. The sensor comprises a sensor volume 1007 comprising an optical material 1006, which is influenced by an external influence 107*a*. The optical material 1006 may be a gas or a fluid passing through the sensor volume 1007. The optical material may be a chemical compound, that reacts with a reagent arranged or passing through the sensor volume 1007. The optical material can be a probe for measuring electrical field as mentioned above. The external influence may be a fluid having different refractive index passing or being arranged at a reflector.

UV light is received from interface 204 by interface 1001 and is passed to a fluorescent material 1002, which radiates visible light. An optical filter 1003*a* may prevent passage of UV light to the optical material. The visible light radiated by the fluorescent material is arranged to pass the optical material 1006 in volume 1007 and is passed further to an interface 1005 connected to interface 205. The visible light which is reflected is passed via interface 1004 to interface 205.

Figure 11:
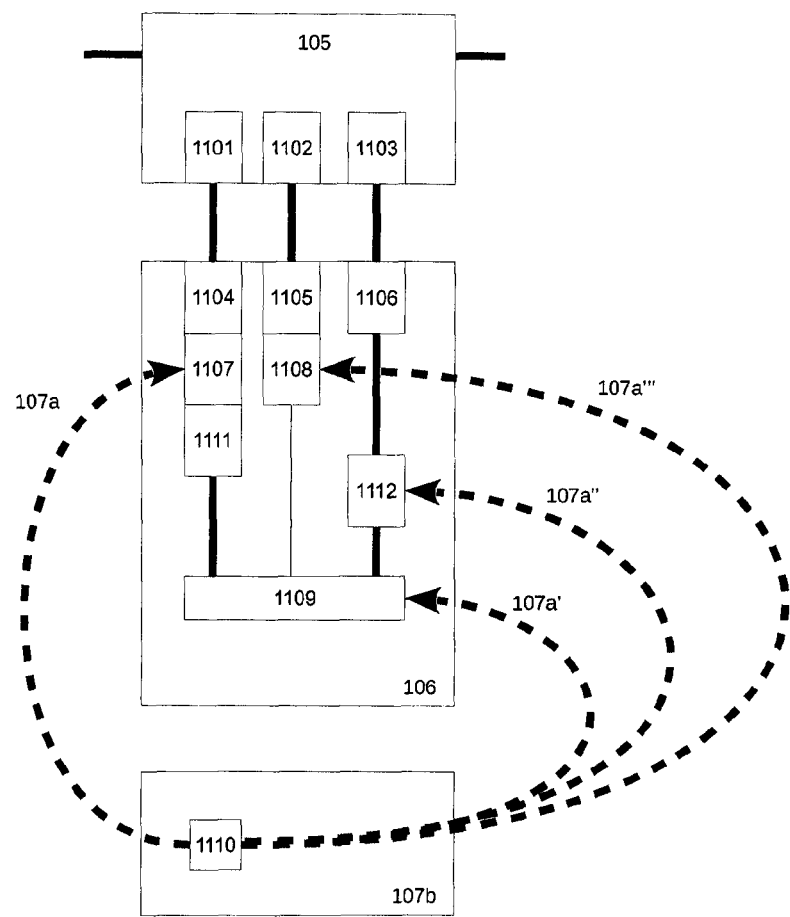
FIG. 11 is a block diagram of another embodiment of a selector and a sensor.

FIG. 11 shows a selector 105 diverting UV light from interface 1101 to interface 1104, diverting NIR light from interface 1102 to interface 1105 and collecting visible light from interface 1106 to interface 1103. The light source 101 emits NIR light and may also emit UV light. The NIR light activates the charged particle generator 1108 to produce charged particles, such as electrons, which are passed on to a luminescent material 1109 that radiates visible light, for example by the electroluminescence. UV light 1104 is passed to an optional fluorescence material 1107. An optional optical filter 1111 may prevent UV light to be passed on to the luminescent material 1109. A measurement object 107*b* can pass a plurality of properties 1110, by passing the properties by at least one of the external influences 107*a*, 107*a'*, 107*a"* and 107*a'''*. A modulated optical signal in a visible wavelength spectra is via interface 1106 passed further on to the detector 109 via interface 1103 in selector 105.

External influence 107*a* modulates a fluorescent material 1107 by quenching the radiated visible wavelength spectra similar to the embodiment according to FIG. 3.1. External influence 107*a'* modulates a luminescent material 1109 by quenching the radiated visible wavelength spectra similar to the embodiment according FIG. 3.1. External influence 107*a"* modulates the passed visible wavelength spectra for example via absorption, polarization or reflection as passed information 107*a"* similar to the embodiment according to FIG. 3.2. External influence 107*a'''* modulates how the charged particle generator 1108 produces charged particles. As a consequence, the radiated light from the luminescent material 1109 may be modulated.

As an alternative when information is passed from a measurement object 107*b* by external influence (107*a*, 107*a'*, 107*a"*, 107*a'''*) to a sensor 106, a small portion of a volume containing matter can be passed as information to the sensor. The size of the volume can be from the atom size to human cell size, however also larger.

As an alternative when information is passed from a measurement object 107*b* by external influence (107*a*, 107*a'*, 107*a"*, 107*a'''*) to a sensor 106, for example as shown in FIGS. 3.1, 3.2, 9, 10 and 11, alternatively or additionally said external influence passed by information paths (107*a*, 107*a'*, 107*a"*, 107*a'''*) may be passed as: temperature which is conducted to or surrounds the fluorescent material, by convective heat transfer, by radiated heat transfer, wavelength light spectra, by light polarization, by entanglement. Properties that may be measured by direct influence upon the fluorescent material and modulate its radiation of visible light are concentration of species like molecules, by proteins, by cells, by magnetic field, by electric field, by vibrations, by pressure, by radiation of particles like electrons, by radiation of electromagnetic waves, by moving matter, by using a surrounding liquid, by using diffusion, by using small containers, by using Brownian movements, by mechanics, by electric force, by magnetic force, by light, by vibrations, by light polarization such as rotation, by moving liquid by electrics, by moving liquid by magnetics, by moving matter.

As an alternative when information is passed from a measurement object 107*b* by external influence (107*a*, 107*a'*, 107*a"*, 107*a'''*) to a sensor 106 said external influence may be passed by plurality of ways where at least one of the mentioned ways may be used to pass external influence.

A further embodiment is shown in FIGS. 12.1 and 12.2. FIG. 12.1 shows the active unit 1415 comprising one or several LED:s 1401 emitting UV light. The LED:s are controlled by a control processor 1411. The UV light from the LED:s are focused on at least one optical path 1402 by a collimator lens 1403. A further collimator lens 1404 focus the UV light on a sharp UV filter 1405 passing only UV light of said predetermined wavelength spectrum, for example between 300 nm to 350 nm as shown by spectrum 1406. There are at least two different sharp UV filters, which are selectable by a mechanical slider controlled by the control processor 1411. A further collimator lens 1407 focus the passed UV light at another optical path 1408 and a still further collimator lens 1410 focus the UV light at an optical filter 1412 (UV reflective/visible light transmission filter). The filter is arranged at 45 degrees in relation to the optical path 1408. The optical filter 1412 is arranged to reflect UV light to the right in the figure and via a further collimator lens 1413 to an optical path 1414, which is connected to the optical link 104*a*, as shown in FIG. 1.

In addition, the optical filter 1412 is arranged to pass visible light, which may arrive from the right in the figure from the optical link 104*a*. The spectral distribution of the optical filter 1412 is shown schematically at the spectrum 1419, in which low transmission results in reflection of the light and high transmission results in passage of the light. Thus, visible light arriving from optical link 104*a* via optical path 1414 is focused by collimator lens 1413 and passes the optical filter 1412 to the left in the figure. The visible light is focused by collimator lens 1416 to a further optical path 1417. Via a further collimator lens 1418, the visible light is focused on at least one detector 1409, which converts the visible light to electric signals sent to a real-time processor 1410.

The other end of the optical link 104*a* is connected to a passive unit shown in FIG. 12.2. The passive unit comprises an optical path 1431 and a collimator lens 1432 which focus the received UV light at a UV reflective/visible light pass filter 1433 of the same type as filter 1412 and having spectrum 1434. The UV light passing from the left is linked 90° downward and focused by collimator lens 1435 to an optical path 1436. A further collimator lens 1437 focus the UV light at a sharp UV transmission filter 1438 of the same type as filter 1405 and having a spectrum 1439. The UV light within the filter passband passes right through the filter 1438 and the rest of the UV light is reflected to the right in the figure.

The UV light passing through the filter 1438 is focused by a collimator lens 1440 to an optical path 1441 and further via a collimator lens 1443 to a UV reflective/visible light transmissive filter 1444 having a spectrum 1446 and arranged at 45° in relation to the optical path. The incident UV light at the filter 1444 is reflected to the left in the figure and focused by a collimator lens 1447 to an optical path 1448 and is passed to a fluorescent material 1442.

The fluorescent material radiates visible light in all directions when excited by UV light. The visible light passes to the right in optical path 1448 and is focused by collimator lens 1447 at the optical filter 1444, which passes visible light which is focused by collimator lens 1449 at an optical path 1450. The visible light is focused by a collimator lens 1451 at a reflecting prism 1452 and passes downward in the figure and is focused by a collimator lens 1454 to an optical path 1455. The visible light is further focused by a collimator lens 1456 at a reflecting prism 1457, which reflects the visible light to the right and via a collimator lens 1458 to another reflecting prism 1459, which passes the visible light upwards in the figure.

The reflecting prisms 1457 and 1459 are in contact with a medium to be measured included in a volume 1445. The medium to be measured may be a dressing at a wound which comprises fibers, for example of cotton, and air in between the fibers. When the wound gives off wound exudate, the fluid will perform an external influence of the optical properties at the interface with the prisms 1457 and 1459, which results in a modulation which may be detected. For example, the total inner reflection of the prisms 1457 and 1459 is partially or completely removed when there is fluid at the outer surface of the prism, whereby the prism will cease to reflect the visible light.

The visible modulated light passing upwards in the figure from prism 1459 is focused by collimator lens 1460 to an optical path 1461. A further collimator lens 1462 focuses the visible modulated light at a reflecting prism 1463 and a collimator lens 1464 focuses the light at a two-to-one combiner 1465. The modulated light passes along the combiner 1465 and a collimator lens 1478 focuses the light at said filter 1433, which is transmissive for visible light. The visible modulated light passes to the left in the figure, via collimator lens 1432 and optical path 1431 to optical link 104a as mentioned above.

The UV light which does not pass the sharp UV filter 1438 is reflected to the right in the figure by the filter 1438 and is focused by a collimator lens 1466 at an optical path 1467 and further via collimator lens 1468 to a reflecting prism 1469. The UV light passes upward in the figure and is focused by a collimator lens 1470 at an optical path 1471 and is further focused by a collimator lens 1472 at a UV reflective/visible light transmissive filter 1473 having a spectrum 1479 and being of the same type as filter 1433. The UV light is reflected to the right in the figure and is focused by a collimator lens 1474 to an optical path 1475, which may be coupled to another passive unit via an optical link 104b. In this manner, the UV light received by the passive unit and not selected for the fluorescent material, is passed further on to the next passive unit, if present.

The next passive unit may produce a modulated optical signal, which is received from the right by the optical path 1475 and is focused by collimator lens 1474 at the optical filter 1473, which transmits visible light. Thus, the visible modulated light from the next passive unit passes to the left through filter 1473 and is focused by a collimator lens 1476 at an optical path 1477. The optical path 1477 is connected to the upper branch of the two-to-one-combiner 1465 and is combined with any modulated light from the first passive unit. The visible modulated light is finally received by the detector, as described above.

The prisms 1457 and 1459 may be arranged so that the light between the prisms passes an absorbent material, which forms said external influence. If the absorbent material is a gas, such as air, there will be less absorbance and if the absorbent material comprises a fluid such as wound exudate, there will be more absorption.

FIG. 13.2 shows a wavelength spectrum 1303 produced by two wavelength spectra 1301 and 1302. The two wavelength spectra 1301, 1302 may be produced by two LED:s or by a single light source filtered by two different filters. The combined wavelength spectrum 1303 is transmitted to the optical link 104a. A passive unit may select one or the other wavelength spectrum, since they are separateable.

FIG. 13.3 shows another wavelength spectrum 1306 produced by two wavelength spectra 1304 and 1305. The two wavelength spectra 1304, 1305 may be produced by two LED:s or by a single light source filtered by two different filters. The combined wavelength spectrum 1306 is transmitted to the optical link 104a. The combined wavelength spectrum 1306 is not easily separateable by a passive unit, since the tops are too close. Thus, the combined wavelength spectrum 1306 may be used as a single wavelength spectrum.

FIG. 14.1 shows a single passive unit 1401 comprising a selector/sensor 1402 and a measurement object 1404 having at least one measurement property 1405, which influences upon the sensor 1402 via external influence 1403.

FIG. 14.2 shows two passive units 1411 and 1421 comprising each a selector/sensor 1412, 1422 and a measurement object 1414 and 1424 comprising at least one measurement object property 1415, 1425. The measurement property influences upon the sensor via external influences 1413 and 1423.

FIGS. 15.1 to 15.4 show different selector configurations. FIG. 15.1 shows a simple configuration corresponding to FIG. 1, with a connector 1502 for receiving UV-light for transmission to interface 1503 and for receiving visible light from interface 1504 and possibly also received from interface 1505. In addition, there is a transmission of UV-light to a further at least one passive unit via connector 1505. FIG. 15.2 shows a configuration when there is no further passive unit in the chain, with a connector 1512 for receiving UV-light for transmission to interface 1513 and for receiving visible light from interface 1514. FIG. 15.3 shows a configuration with a first separate connector 1533 for UV-light passing to interface 1534 and also further to interface 1536 to the next at least one passive unit, and optionally a second separate connector 1532 for returning visible light produced by the sensor via interface 1535 and possibly also received from interface 1537, see further below. Finally, FIG. 15.4 shows an alternative configuration with all transmission options included in the same component 1558. Connector 1553 is arranged for transmitting UV-light to interface 1554 and also to a further at least one passive unit via connector 1556. Connector 1552 is arranged for receiving visible light from interface 1555 and from connector 1557 from an optional further at least one passive unit.

Figure 16:
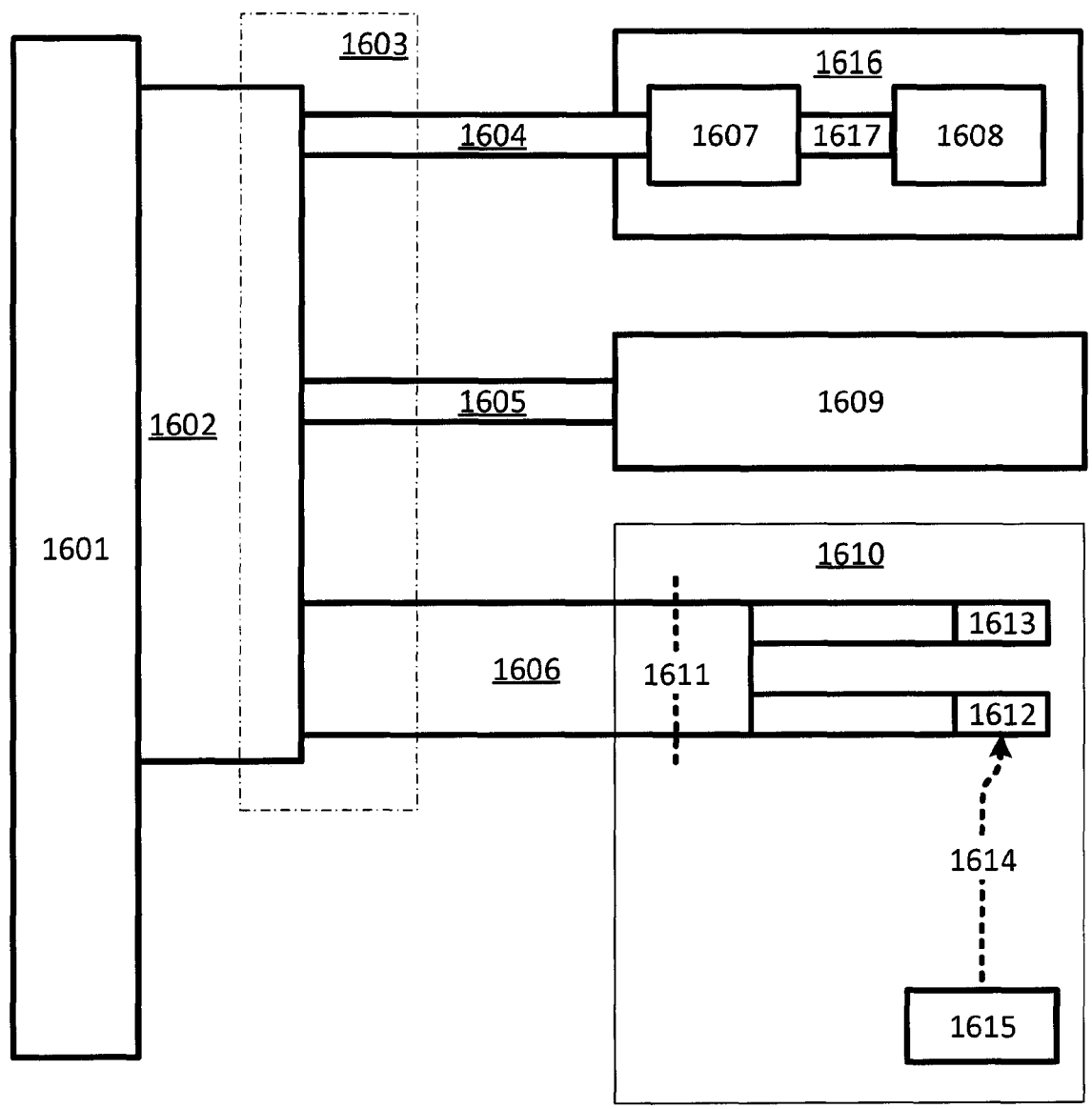
FIG. 16 is a schematic block schema of an embodiment of a passive unit.

FIG. 16 shows a configuration in which an active unit 1601 corresponding to active unit 115 is connected to an optical link 1602. A splitter 1603 divides the UV-light in three optical link branches 1604, 1605, 1606. Branch 1606 transmits the UV-light to a passive unit 1610 comprising a first fluorescent material 1612, which is influenced upon by measurement object 1615 via external influence 1614. In addition, there is a second branch comprising a second fluorescent material 1613, which is not influenced upon by any external influence. The first fluorescent material may emit light at a first wavelength spectrum, such as red light, while the second fluorescent material may emit light in a different wavelength spectrum, such as green light. The second fluorescent material is used for calibration. Any error sources will act similarly on both the first and the second fluorescent material and on the transmission paths, which can be used for compensating for the error sources. The second branch 1605 operates a second passive unit 1609 in a similar manner. The third branch 1604 operates two series connected passive unit 1607 and 1608 interconnected by a optical link 1617.

Figure 17:
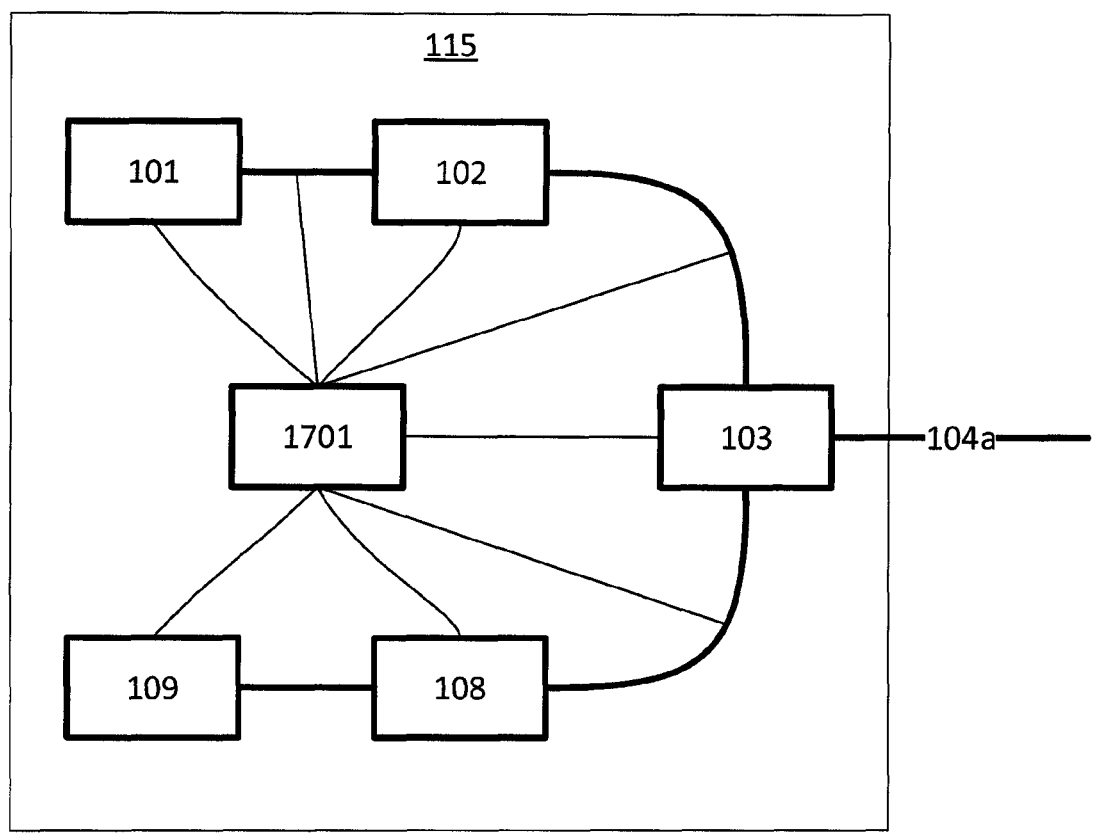
FIG. 17 is a block schema of an embodiment of an active unit.

FIG. 17 shows the active unit 115 with the light source 101, the optional optical transmission filter 102, the optional optical multiplexer 103, the optical detector 109 and the optional optical receiver filter 108 as described in FIG. 1. All components and the connecting optical paths may optically influence each other through a general leakage object 1701. The components may be arranged in such a way that these leakages do not interfere with measurements, for example by arranging light absorption material between optical components, using filter with high Optical Density (OD), etc.

FIGS. 18.1 to 18.5 show different connection possibilities between an active unit 115 via optical link to one or several passive units 117 or groups of passive units 116. FIG. 18.1 shows a single passive unit 117 connected to the active unit 115 via a single optical link. FIG. 18.2 shows a single group of passive units 116 comprising at least two passive units 117 and connected to the active unit 115 via a single optical link. FIG. 18.3 shows a single group of passive units 116 comprising at least two passive units 117 and connected to the active unit 115 via a double optical link, wherein the UV-light may pass via one optical link and the visible return light may pass via the other optical link. FIG. 18.4 shows an active unit 115 comprising a splitter for connection to at least two, such as three optical links, wherein each optical link is connected to at least one passive unit 117. FIG. 18.5 shows an active unit 115 comprising a splitter for connection to several optical links, such as three optical links, wherein each optical link is connected to a group of passive units 116 each comprising at least two passive units 117. Other combinations may be used.

Figure 19:
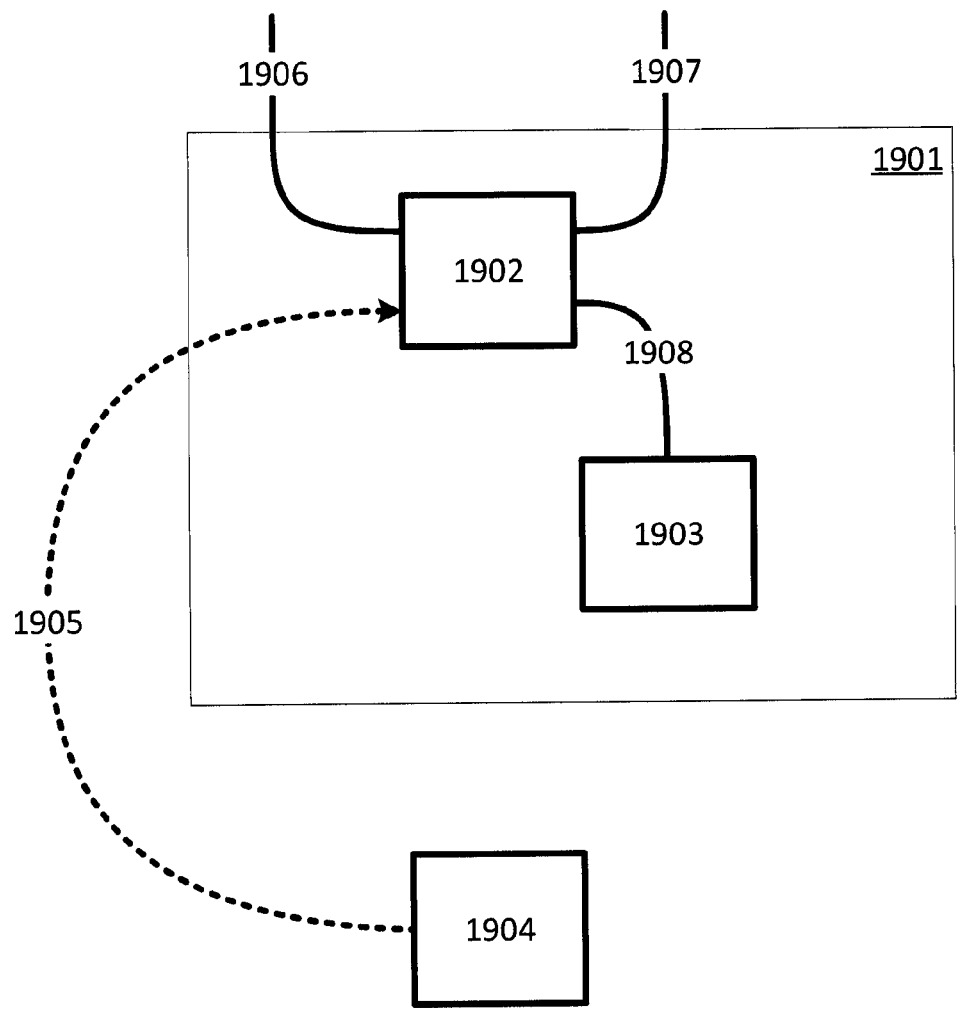
FIG. 19 is a block schema of an embodiment of a passive unit.

FIG. 19 shows a passive unit comprising a sensor 1901. UV-light is received via interface 1906 and visible light is returned via interface 1907. The UV-light causes a fluorescent material 1902 to emit light, which is modulated by a property of a measurement object 1904 via external influence 1905. A portion of the UV-light is passed via optical path 1908 to a second fluorescent material 1903 which is free from external influences and is used for calibration.

FIGS. 20.1 to 20.5 show embodiments of the optical link between the active unit 115 and a group of passive unit 116. FIG. 20.1 shows a single optical fiber interconnecting the active unit 115 and the group of passive units 116. FIG. 20.2 shows a double optical fiber, wherein the first fiber may transmit UV-light to the group of passive units and the second fiber may transmit visible light from the group of passive units. FIG. 20.3 shows that UV-light and visible light may be transmitted as light rays in a medium, such as air or a gas. FIG. 20.4 shows that the optical link may comprise three (or more) transmission paths, such as optical fibers.

FIG. 20.5 shows at least one active unit 115 having one or several light sources and one or several detectors. There is at least one group of passive units 116 each passive unit comprising at least one sensor. There are several optical paths 2051, wherein each optical path transmits light in one or both directions to at least one of the following objects: a light source 101, a transmitter filter 102, a multiplexer 103, a receiver filter 108 and a detector 109. When optical path 2051 include many paths, also other paths in the active units have one or several optical paths. Each optical path 2051 ends at an exclusive portion of a surface 2052 arranged near the active unit. There are several optical paths 2057, wherein each optical path transmits light in one or both directions to at least one of the following objects: a passive unit 117, a selector 105 interface 201, 1502, 1212, 1532, 1533, 1552, 1553, 2707, or a sensor 106. Each optical path 2057 ends at an exclusive portion of a surface 2056 arranged near the passive unit. An optical component 2054, such as a lens, projects the majority of surface 2052 to the majority of surface 2056 via interfaces 2053 and 2055, and vice versa. The projection may take place at the same time or at different time points. The interfaces may transmit light, and may be glass, gas, air, liquid, water or vacuum. The optical component may be a lens or a lens system; a scanner arranged as at least one moveable mirror; a multiplexer, or any combinations thereof. Light from the light sources 115, such as UV-light, is transmitted to one or several optical paths 2051 and is projected on one or several optical paths 2057 to be transmitted to at least one sensor of said group of passive units. Light from each sensor in said passive units, such as visible light, is transmitted to one or several optical paths 2057 and is projected on one or several optical paths 2051 to be transmitted to at least one detector in the active unit, in which the detector may be a CCD in which each pixel is a detector.

Figure 21:
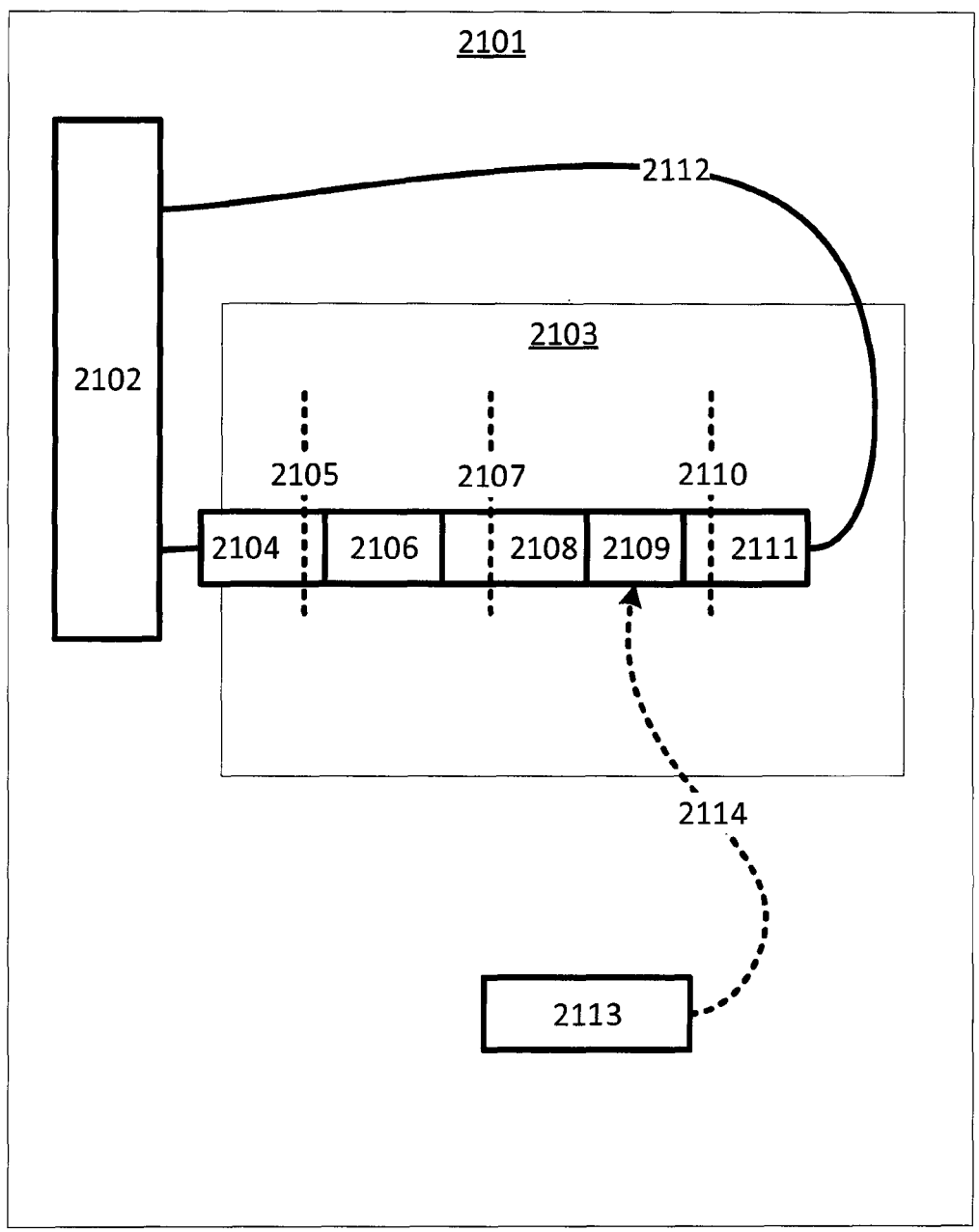
FIG. 21 is a block schema of an embodiment of a passive unit.

FIG. 21 shows a more detailed embodiment 2101 of a passive unit in which two separate optical paths are used. A selector 2102 passes UV-light via an interface 2104 (which may comprise a filter 2105) to a fluorescent material 2106, which emits visible light, which is transmitted via an interface 2108 to an absorbent material 2109. The interface 2108 may optionally comprise a filter 2107 preventing UV-light to pass to the absorbent material. A measurement object 2113 acts upon the absorbent material via an external influence 2114 and modulates the visible light. The modulated visible light is transmitted via an interface 2111 to a second optical path 2112, which transmits the visible light back via the selector 2102 to the active unit. An optional filter 2110 may be arranged in the interface 2111.

Figure 22:
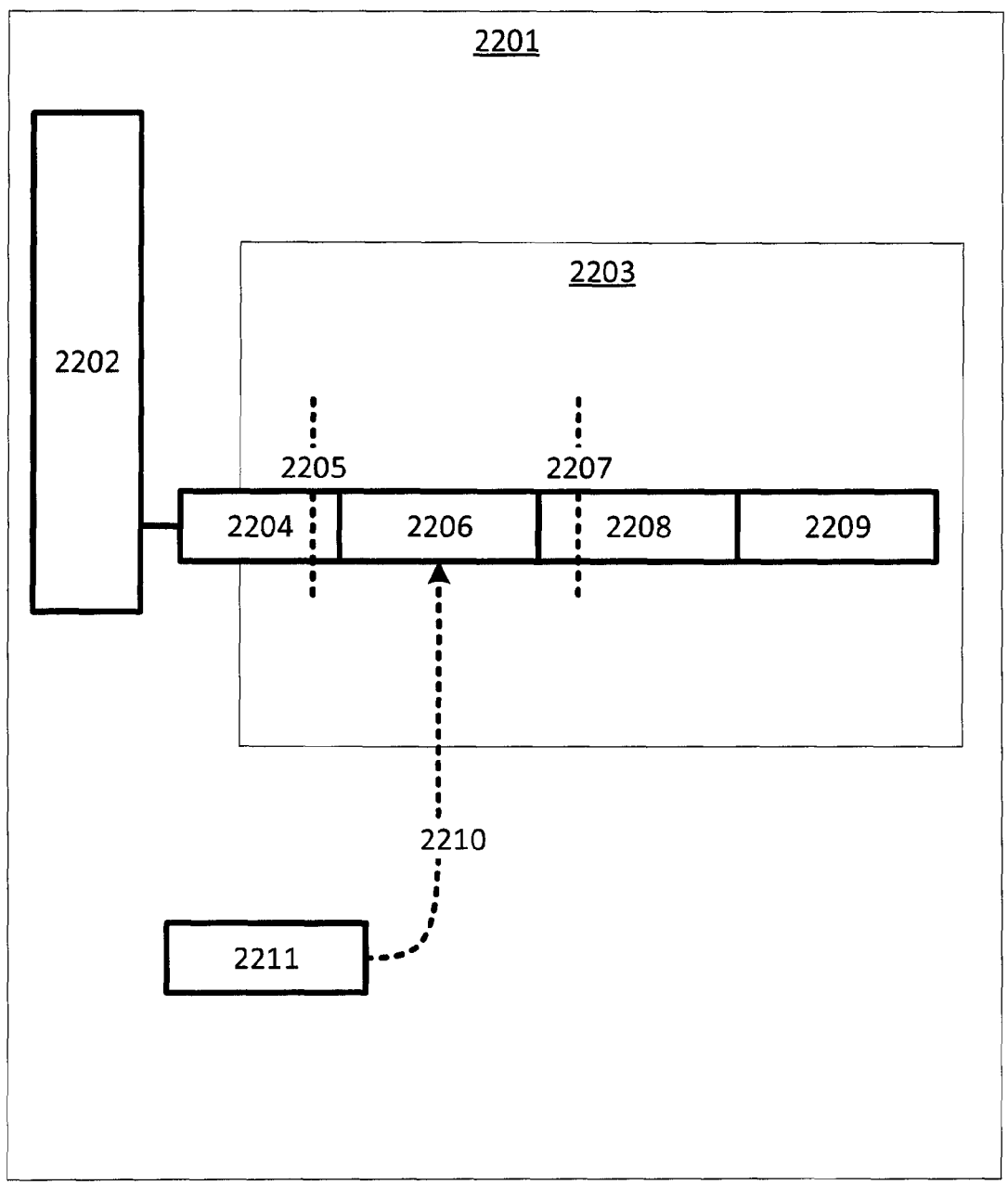
FIG. 22 is a block schema of another embodiment of a passive unit.

FIG. 22 shows an embodiment 2201, in which the UV-light and the visible light passes in the same optical path inside the passive unit. A selector 2202 transmits UV-light via an interface 2204 (optionally including a filter 2205) to an absorbent material 2206. The UV-light passes the absorbent material and via an interface 2208 (optionally including a filter 2207) to a fluorescent material 2209. The fluorescent material 2209 emits visible light in all directions. A mirror may be arranged in the end of the fluorescent material 2209. The visible light is transmitted back via interface 2208 to the absorbent material. A measurement object 2211 acts upon the absorbent material via en external influence 2210 and modulates the visible light, which is passed via interface 2204 and the selector 2202 to the active unit.

Figure 23:
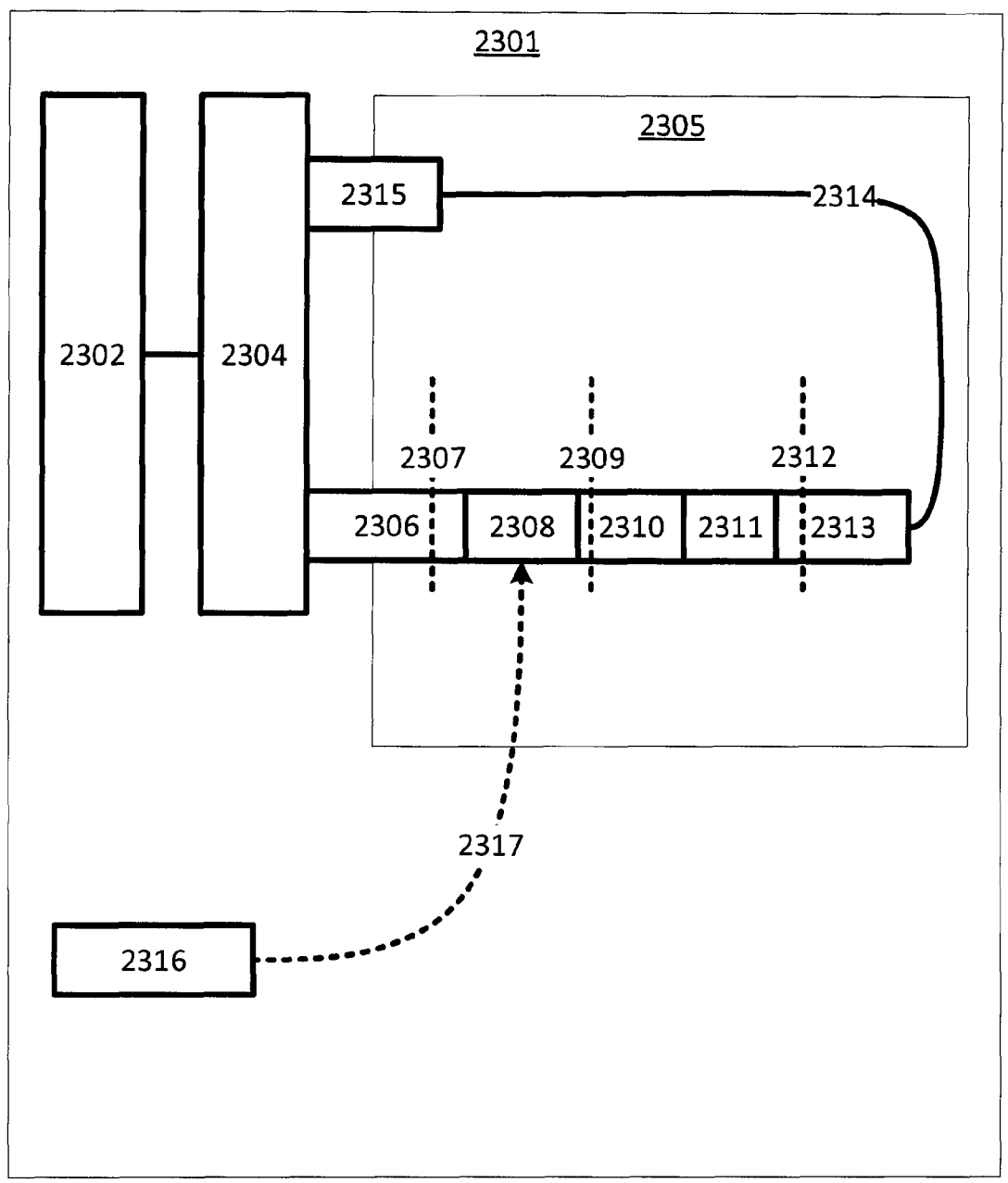
FIG. 23 is a block schema of further embodiment of a passive unit.

FIG. 23 shows an embodiment 2301, in which a selector 2302 transmits UV-light via an optical path to an interface 2304. The UV-light is passes via interface 2306 (optionally including a filter 2307) to a modulation material 2308, which may be a prism which reflects light if there is air outside the prism but does not reflect light if there is a fluid (water) outside the prism. A similar operation may be obtained by an optical fiber having a sharp bend. A measurement object 2316 acts upon the modulation material 2308 via an external influence 2317, which may be presence or non-presence of a fluid. The UV-light passing the modulation material passes via an interface 2310 (optionally comprising a filter 2309) to a fluorescent material 2311, which emits light in dependence of the UV-light passing the modulation material 2308. The visible light passes via interface 2313 (optionally comprising a filter 2312) and via an optical path 2314 to an interface 2315 and to the interface 2304. The modulation material may alternatively be a filter, which is modulated by an external influence, for example temperature. Thus, the UV-light is modulated by said external influence before it stimulates the fluorescent material.

Figure 24:
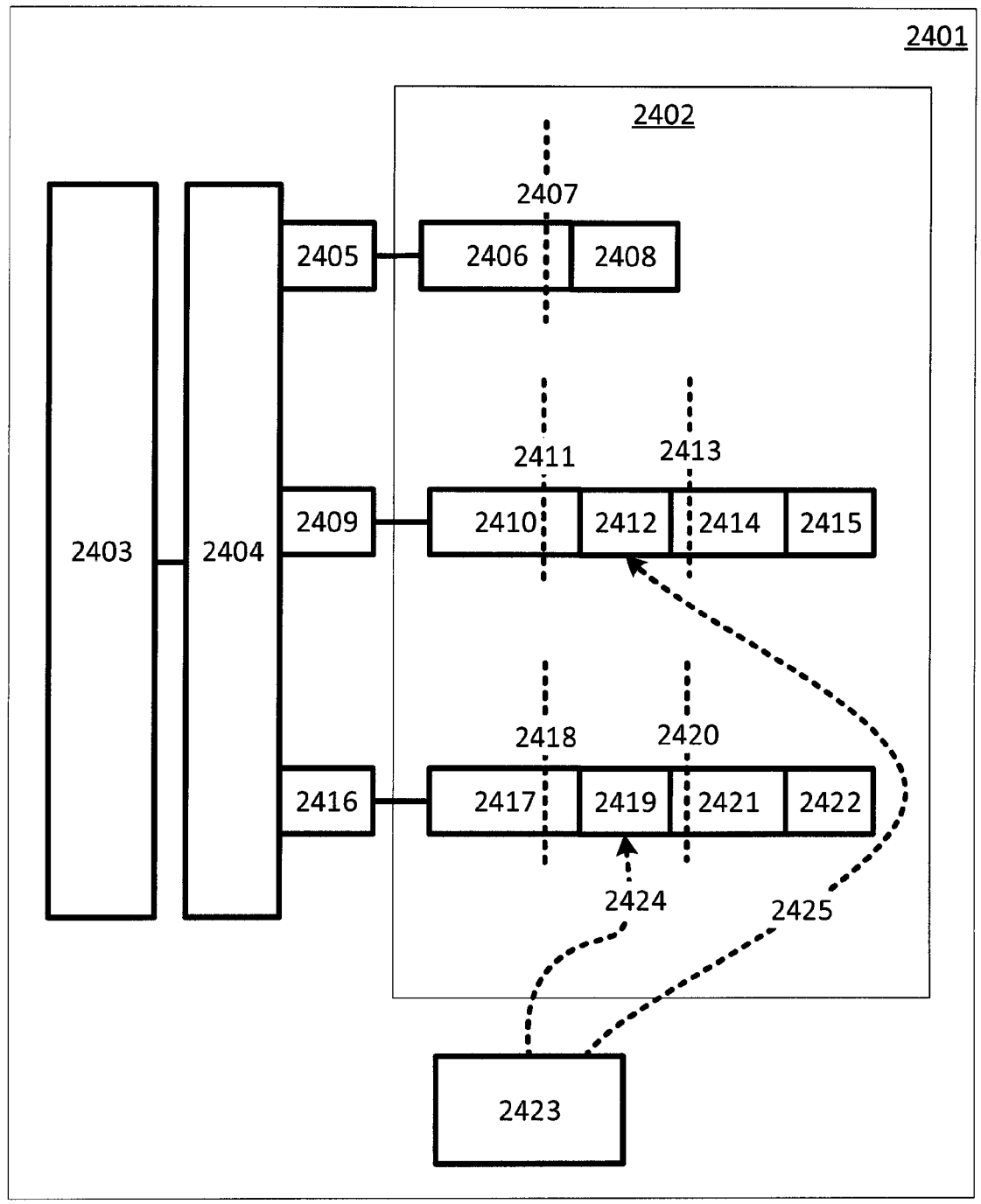
FIG. 24 is a block schema of still further embodiment of a passive unit.

FIG. 24 shows an embodiment 2401, in which a selector 2403 transmits UV-light to a splitter 2404. A first path 2405 transmits UV-light via an interface 2406 (optionally comprising a filter 2407) and further to a fluorescent material 2408, which is not receiving any external influence and is used for calibration. A second path 2409 transmits UV-light via an interface 2410 (optionally comprising a filter 2411) to an absorbent material 2412, receiving an external influence 2425 from the measurement object 2423. The UV-light is passed further via an interface 2414 (optionally comprising a filter 2413) to a fluorescent material 2415, which emits visible light in all directions. The visible light is passed back via interface 2414 to the absorbent material 2412 and via interface 2410 and the second path 2409 to the selector and further to the active unit. A third path 2416 transmits UV-light via an interface 2417 (optionally comprising a filter 2418) to an absorbent material 2419, receiving an external influence 2424 from the measurement object 2423. The UV-light is passed further via an interface 2421 (optionally comprising a filter 2420) to a fluorescent material 2422, which emits visible light in all directions. The visible light is passed back via interface 2421 to the absorbent material 2419 and via interface 2417 and the third path 2416 to the selector 2403 and further to the active unit. Both the two external influences 2424 and 2425 emanates from the same measurement object 2423 and may for example be refraction index and absorbency. Another example may be absorbency in two different visible light spectrum, green and red.

Figure 25:
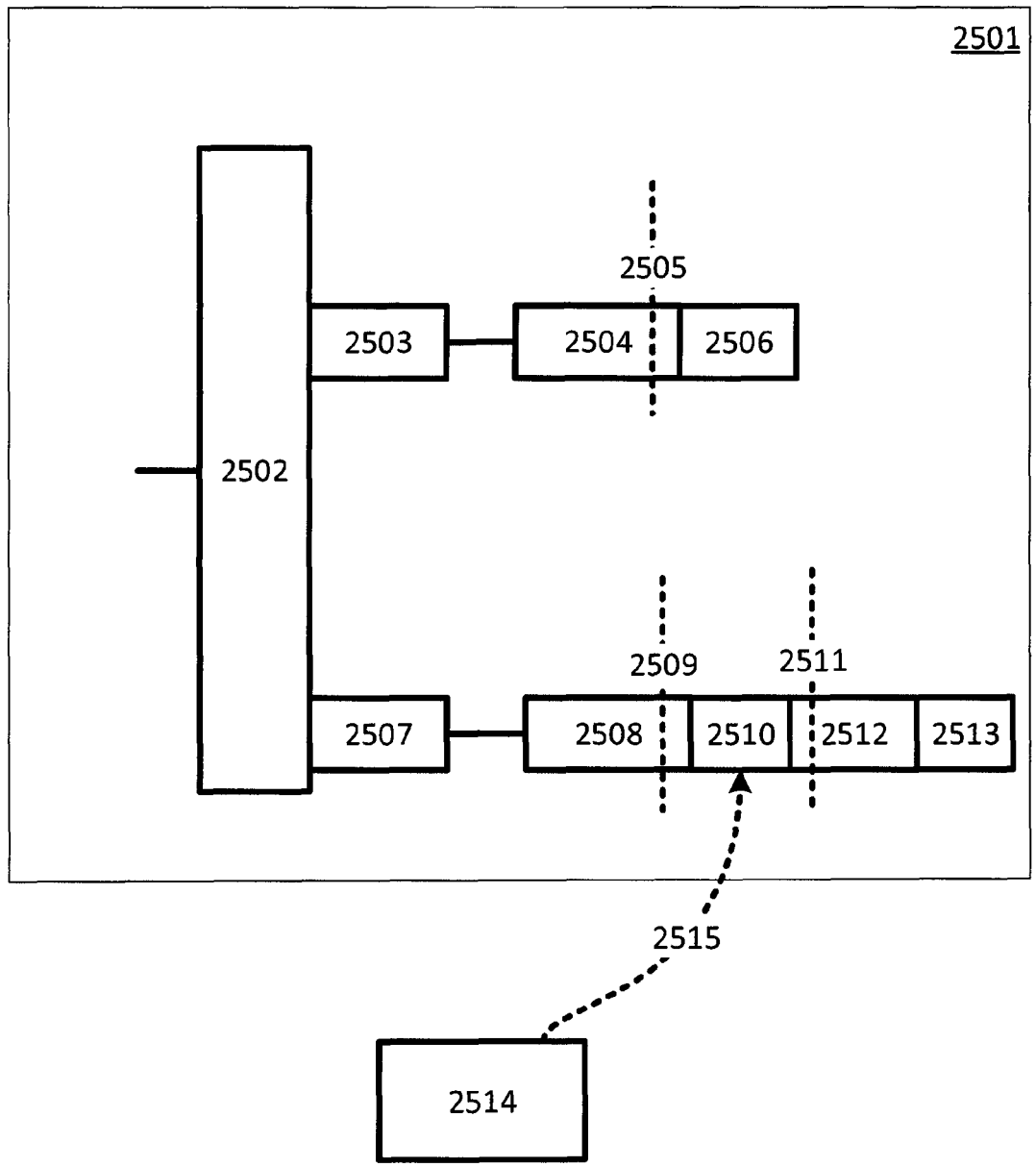
FIG. 25 is a block schema of yet further embodiment of a passive unit.

FIG. 25 shows an embodiment 2501 similar to FIG. 24 but measuring only one measurement object property. A selector 2502 transmits UV-light via a first interface 2503 and via an interface 2504 (optionally comprising a filter 2505) to a fluorescent material 2506, which is not receiving any external influence and is used for calibration. A second interface 2507 transmits UV-light via an interface 2508 (optionally comprising a filter 2509) to an absorbent material 2510, receiving a external influence 2515 from the measurement object 2514. The UV-light is passed further via an interface 2512 (optionally comprising a filter 2511) to a fluorescent material 2513, which emits visible light in all directions. The visible light is passed back via interface 2512 to the absorbent material 2510 and via interface 2508 and the second path 2507 to the selector 2502 and further to the active unit.

FIG. 26.1 shows an embodiment 2601, in which the same measurement object 2607 has two (or several) measurement object properties 2608, 2609 causing external influences 2610 and 2611 to act upon a sensor 2604. UV-light is received from the active unit 2602 via an optical link and a selector 2603 to the sensor 2604.

FIG. 26.2 shows an embodiment 2621 comprising two (or several) passive units. UV-light is transmitted by active unit 2622 and optical link to two selectors 2625 and 2630. Each selector transmits UV-light to each a sensor 2626 and 2631. One or several measurement object properties 2629 of measurement object 2628 acts upon sensor 2626 via external influence 2627 and one or several measurement object properties 2634 of measurement object 2633 acts upon sensor 2631 via external influence 2632.

FIG. 26.3 shows an embodiment 2667 in which a selector 2652 transmits UV-light via an interface 2653 (optionally comprising a filter 2654) to a first absorbent material 2655. A first external influence 2663 from measurement object property 2664 of measurement object 2662 acts upon the first absorbent material 2655. UV-light is further transmitted via an interface 2657 (optionally comprising a filter 2656) to a second absorbent material 2658. A second external influence 2665 from measurement object property 2666 of measurement object 2662 acts upon the second absorbent material 2658. UV-light is further transmitted via an interface 2660 (optionally comprising a filter 2659) to a fluorescent material 2661, whereupon visible light is transmitted in the opposite direction. The two measurement object properties 2664 and 2666 relates to the same measurement object 2662.

FIG. 26.4 shows an embodiment 2671 in which an active unit 2672 transmits UV-light to a selector 2673 of a first passive unit and to a selector 2674 of a second passive unit and further on to further passive units if present. The selector 2673 passes UV-light to a sensor 2675, which receives an external influence 2677 from a measurement object property 2680 of a measurement object 2679. The selector 2674 passes UV-light to a sensor 2676, which receives an external influence 2678 from the same measurement object property 2680. The external influences 2677 and 2678 may be of the same type, for example refraction index, or different types, for example absorbency and refraction index. The external influences 2677 and 2678 emanates from the same measurement object 2679.

FIG. 27.1 is a schematic drawing of a sensor layer 2702, which may be arranged in a dressing intended to be applied to a wound to be monitored. The geometry of the sensor layer may be in a sheet form with small thickness or as one or several cylinders or any other geometry, such as square, triangular, etc. The sensor layer 2702 comprises several passive units 2707 interconnected by optical links 2708. The optical links are connected to an active unit via a further optical link 2701. The optical links are branched by several splitters 2709 into several groups of passive units. The passive units may be arranged to measure several properties of the measurement object, such as presence of exudate over the surface of the dressing, or presence of blood over the surface of the dressing. In the enlargement 2703, the passive unit is shown as an optical fiber ended with a cone, which may measure refraction index of a medium in contact with the cone. In the enlargement 2704, the passive unit comprises a splitter. In the enlargement 2705, the passive unit may measure absorbance of a medium arranged in an optical path of the passive unit. In the enlargement 2706, the passive unit is shown without being connected to a further passive unit. The passive units are arranged at a flexible support material, which may be thin.

FIG. 27.2 is a cross-sectional view of a sensor layer similar to the sensor layer according to FIG. 27.1. The optical links are connected to an active unit via a further optical link 2711. When arranged in a dressing, the sensor layer according to FIG. 27.2 is arranged to face a wound at the bottom surface possibly via another layer, wherein the passive units 2714 and 2715 are arranged at different distances from the wound, for determining the degree of saturation with exudate of the dressing.

FIG. 27.3 is a plan view of a sensor layer 2722 similar to FIG. 27.1 and shows four groups of passive units connected to a splitter 2721. The upper group comprises two passive units connected in series. The second group comprises a single passive unit connected in a loop. The third group comprises two passive units connected in series and in a loop. The fourth group comprises a single passive unit followed by a splitter to three paths, of which two paths comprises two passive units connected in series and the third path comprises a single passive unit. Further configurations may be used.

FIG. 27.4 shows a sensor layer wherein UV-light is transmitted via optical link 2732 and via an interface 2733 to four splitters. Each splitter diverts the UV-light so a separate passive unit. A combiner 2734 combines the modulated signal received from each of the four passive units and transmits the signals via optical link 2735 to the active unit.

Figure 28:
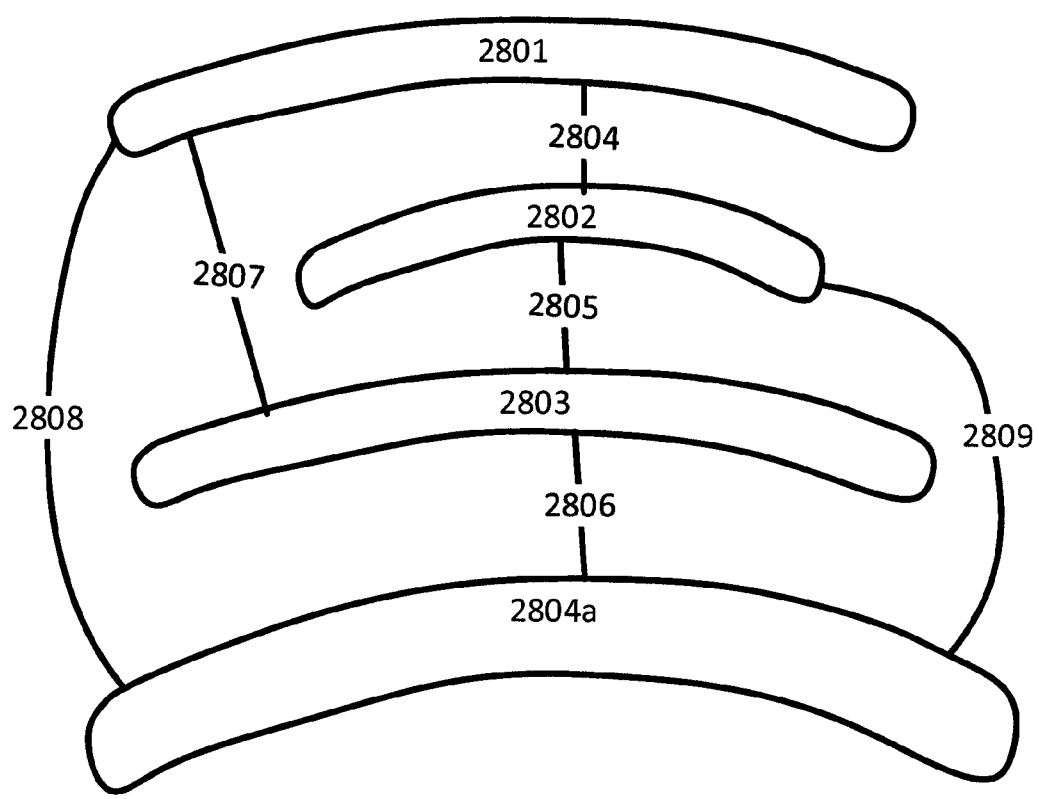
FIG. 28 is a side view of a dressing provided with a sensor layer.

FIG. 28 shows an embodiment of a dressing arranged above a surface 2804*a*, where said surface is located near a wound or near body fluids, or near excaudate. The dressing may comprise a top layer 2801 (optional) and a bottom layer 2803 intended to be arranged in contact with the surface 2804*a*. Each layer may have an internal structure with sublayers. A sensor layer 2802 is arranged above the bottom layer 2803 The top layer 2801 is optionally arranged above the sensor layer. The top layer may protect the sensor layer from stray light, and may be opaque. Exudate or blood or other liquids or gases or measurement properties may pass between the layers as indicated by the lines 2804, 2805, 2806, 2807, 2808 and 2809 and may also pass through the sensor layer 2802.

The sensor layer may be manufactured in large quantities and arranged in coils to be arranged at dressings.

The dressing layer relates to a plaster or band-aid or similar. The plaster may be tailored to the wound to be treated. The dressing layer may comprise a release paper, adhesive material, liquid moving material, moisture transfer material, spacer material, mechanical structure material, cosmetic material, etc. The sensor layer may be arranged in contact with one or several dressing layers, optionally via the contact layer. Additionally or alternatively, the sensor layer may partly or completely contact the wound or skin.

The luminescent material may be a fluorescent material as indicated above, which is activated by light with a higher energy than the fluorescent light. In addition, materials with other types of luminescence may be used such as: electroluminescent material; chemiluminescent material; bioluminescent material; electrochemiluminescent material; lyoluminescent material; candoluminescent material; cathodoluminescent material; piezoluminescent material; phosphorescent material; Raman emission material; radioluminescent material; thermoluminescent material.

The properties of a measurement object that can be measured by the device and optical sensor according to the above embodiments are numerous. A few properties are mentioned below. If a method to measurement the property is not obvious, also such a method is described:

Pressure as absolute value or relative value between two separate volumes, taken in different directions, caused by any kind of interaction, for example: mechanical, fluid, gas, vacuum, electromagnetic, acoustics, chemical, and other quantity describing a physical state;

Force as absolute value or relative value between two separate volumes, acting on an object caused by any kind of interaction, measured by using optical absorption or shielding in a mechanical structure;

Torque as absolute value or relative value between two separated volumes, acting on an object caused by any kind of interaction;

Acceleration of an object, measured by using a reference mass and force measurement;

Velocity of an object, measured by integrating a measured acceleration;

Pressure of an object;

Displacement of an object measured by using optical absorption or shielding in a mechanical structure, or by integrating measured velocity;

Internal Stress of an object, measured by using optical absorption or shielding in a mechanical structure and measured by using force measurement in small structures orientated in different directions;

Refractive Index measured in a volume, or at an interface;

Optical Transmission;

Optical Absorbance;

Optical Reflection;

Direction Wave Vector, evaluating the main energy direction in an optical energy transportation, measured by arranging small light transmission cavities in different directions and to measure optical transmission in each of them;

Charge close to a volume is measured;

Electric Field close or passing a volume is measured;

Current close or passing a volume is measured, measured by using ohms law and measure electric field;

Magnetic Field close or passing a volume measured;

Magnetic Flux Density close or passing a volume measured;

Resistivity close or in a volume measured, measured by moving the measured material itself in the information path 107*a′′′* modulating the charged particle generator 1108;

Concentration of a species close or in a volume measured, measured by a having a reactive quenching the radiated fluorescence wavelength spectra, where reactive binds to the species, also measured by optical absorption in one or a purity of wavelength spectra;

Reactions Rate of a chemical compound.

In a first embodiment, Liquid filling level detection and optionally blood detection is performed in a dressing placed over a wound outside the human body. It is desired to measure how much liquid a wound dressing has absorbed relative maximum absorption in some relevant volumes, and as an option to detect if a portion of blood above warning or alarm levels is present in relevant volumes, wherein the liquid information is passed to a user as warning information, and wherein blood detection is sent either as warning or as an alarm information to a user.

In a 2:nd embodiment, it is desired to monitor blood leaks from a venous needle of a dialyzing system. An arterial and a venous needle are inserted in an artery/venous fistula. If the venous needle is accidently withdrawn, a large blood loss may occur if not discovered.

In a 3:rd embodiment based on an extension of first embodiment Also, other indicators are interesting when measuring in a dressing and therefore other properties such as: temperature, glucoses, ketones, proteins, bacteria, inflammation, can be measured.

In a 4:th embodiment, measuring health status in both human and animals, it is desired to measure health properties for having a draft indication of a patent health status, where the passive units can be placed in a variety of places like: a wound dressing, in a mobile phone, in clothing, in public environments, on exercising tools, in vehicles. Also properties such as: temperature, glucoses, ketones, proteins, bacteria, inflammation, can be measured.

In a 5:th embodiment, health status device taking measurement around skin, where most measurements are done above and below the top skin surface, typical +/−15 mm, as an option information is passed from volume below the skin to sensors on top of skin. Here needles can be used, specifically can microneedles be used. Also properties such as: temperature, glucoses, ketones, proteins, bacteria, inflammation, can be measured.

In a 6:th embodiment, health status device taking measurements inside the body, where also some measurements can be placed just outside the body. Typical measured properties are: movement, temperature, pulse, blood pressure, substances, nerves, blood species, proteins, cells, bacterizes, virus, vibrations.

In a 7:th embodiment, system status is measured in many kind of power systems, such as power production facilities, electric devices, ignition system, electronic devices, production plants, gearboxes, any kind of bearings, any kind of system where bearings exists, also in many power transmission paths such as cables and tubes, where energy exists in many ways such as electric, nuclear, vapor, chemicals, batteries. As an example the following properties are interesting to measure: temperature, mechanical stress, humidity, electric field, magnetic field, velocity, temperature, wherein measurement can be performed without electrical interference in hazard and high temperature volumes.

In an 8:th embodiment, system status is measured in environments, such as buildings, infrastructure, biological systems, underwater systems, information systems. As an example the same properties as mentioned in embodiment 7 are also here of interest to measure.

In a 9:th embodiment, system status is measured in any kind of moving devices with a mass larger than 10 gram, such as trucks, cars, motorbikes, bicycles, airplanes, trains, tram, rockets, military flying robots, bullets. As an example, the same properties as mentioned in embodiment 6 are also here of interest to measure.

In a 10:th embodiment, system status is measured in any kind of movable device that interact with environment with a wireless communication system, such as mobile phone, smartphone, laptop. As an example, the same properties as mentioned in embodiment 6 are also here of interest to measure.

In an 11:th embodiment, system status is measured in any kind of potential hazard volumes, for example where risk for fire and explosions exists. As an example, the same properties as mentioned in embodiment 6 are also here of interest to measure.

In a 12:th embodiment, measurement in human vital organs, such as brain, heart, lung, liver. As an example, the same properties as mentioned in embodiment 4 are also here of interest to measure.

In a 13:th embodiment, as embodiment 7, however limited to only in bearings or in systems where bearings exist.

In an 14:th embodiment, as embodiment 7, however limited to only usage in gearboxes.

In an 15:th embodiment, as embodiment 7, however limited only to usage in ignition systems.

In the claims, the term "comprises/comprising" does not exclude the presence of other elements or steps. Furthermore, although individually listed, a plurality of means, elements or method steps may be implemented by e.g. a single unit. Additionally, although individual features may be included in different claims or embodiments, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

Although the present invention has been described above with reference to specific embodiment, it is not intended to be limited to the specific form set forth herein. Rather, the invention is limited only by the accompanying claims and other embodiments than those specified above are equally possible within the scope of these appended claims.

The invention claimed is:

1. A device for monitoring a measurement object, comprising:
   an active unit having a light source emitting light with a wavelength emission spectrum; and an optical detector;
   one or several passive units;
   at least one optical link for passing said emitted light from said light source to said one or several passive units; wherein
   each passive unit comprises;
   a sensor;
   a selector for diverting at least a portion of said emitted light to said sensor;
   said sensor comprising a luminescent material being affected by said emitted light being diverted by said selector,
   wherein said light source emits light in said wavelength emission spectrum, such as UV light, that affects said luminescent material and said luminescent material radiates light in a radiated wavelength spectrum, such as visible light, when being affected by said emitted light;
   said sensor being arranged to be sensitive to an external influence by said measurement object for producing a modulated signal of said radiated light during said external influence;
   whereby said modulated signal is passed to said optical detector.

2. The device according to claim 1, wherein said luminescent material is a fluorescent material, which is directly irradiated by said emitted light from said light source for radiating light in said radiated wavelength spectrum.

3. The device according to claim 1, wherein said luminescent material is a material radiating light in said radiated wavelength spectrum when affected by charged particles produced by a charged particle generator comprised in said passive unit and generating charged particles when affected by said emitted light from said light source.

4. The device according to claim 1, wherein said selector comprises:
   an optical device for diverting at least a portion of the light received from said optical link to said passive unit;
   a fixed filter for passing at least a portion of said emitted light from said light source to said sensor.

5. The device according to claim 1, wherein said active unit comprises an optical transmission filter having an adjustable UV passband filter arranged to transmit UV light of different wavelength spectra, such as 200 nm-250 nm; 250 nm-300 nm; 300 nm-350 nm; and 350 nm-400 nm, or any combination thereof.

6. The device according to claim 1, wherein
   an optical receiver filter is arranged before the optical detector.

7. The device according to claim 1, further comprising:
   a control processor for controlling at least one of: said light source and said optical detector.

8. The device according to claim 1, further comprising:
   a real-time processor receiving information from said optical detector.

9. The device according to claim 8, further comprising:
an information result processor receiving information from said real-time processor; and
result definitions comprising information for said information result processor; and
a result output for presenting information from said information result processor to a user.

10. The device according to claim 1, wherein said sensor is arranged to be affected by said external influence directly affecting the radiation of light in said radiated wavelength spectrum, such as visible light, by said luminescent material, for example quenching the radiation of luminescent light by said external infuence, whereby said modulated signal is said radiated light in said radiated wavelength spectrum radiated by said luminescent material.

11. The device according to claim 1, wherein said sensor is arranged to be affected by said external influence for directly affecting said radiated light in said radiated wavelength spectrum of said radiated light radiated by said luminescent material, for example absorb or reflect or scatter the radiated light radiated by said luminescent material, whereby said modulated signal is said radiated light in said radiated wavelength spectrum after said external influence.

12. The device according to claim 1, wherein said sensor is arranged to be affected by external influencer for indirectly affecting said radiated wavelength spectrum of radiated light radiated by said luminescent material, by means of charged particles produced by a charged particle generator comprised in said passive unit, whereby said modulated signal is said radiated light in said radiated wavelength spectrum after said external influence.

13. The device according to claim 1, wherein said sensor is arranged to be affected by said external influence for influencing upon said at least a portion of said emitted light being diverted by said selector, for example absorption, reflection or scattering of said at least a portion of said emitted light before affecting said luminescent material.

14. The device according to claim 1, wherein said passive unit further comprises a filter for preventing emitted light from reaching said measurement object.

15. The device according to claim 1, further comprising means for calibration of the sensor, namely variations in absorption when light is passed through said optical links, variations in said light source, variations in said luminescent material, variations in said charged particle generator, variations in said detector, variations caused by temperature, and variations caused by ambient light radiation.

16. The device according to claim 1, further comprising a wireless transmission line for transmission of information between the components of the device.

17. The device according to claim 1, wherein the device and/or at least one of the components: active unit, control unit, result definition and result output, are arranged in a mobile telephone.

18. The device according to claim 1, wherein said passive unit further comprises a pass filter for passing emitted light to said luminescent material and for preventing radiated light from passing backwards through said pass filter.

* * * * *